US010436034B2

(12) United States Patent
Brozyna et al.

(10) Patent No.: US 10,436,034 B2
(45) Date of Patent: Oct. 8, 2019

(54) AIRFOIL SHAPE FOR A TURBINE ROTOR BLADE (71) Applicant: General Electric Company, Schenectady, NY (US)

(72) Inventors: Lee Larned Brozyna, Mauldin, SC (US); Mark Andrew Jones, Ponte Vedra Beach, FL (US); Matthew Lutz, Mauldin, SC (US); Srinivasa Govardhan Jayana, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 325 days.

(21) Appl. No.: 15/594,704

(22) Filed: May 15, 2017

(65) Prior Publication Data
US 2018/0328178 A1    Nov. 15, 2018

(51) Int. Cl.
*F01D 5/14* (2006.01)
(52) U.S. Cl.
CPC .......... *F01D 5/141* (2013.01); *F05D 2250/74* (2013.01)
(58) Field of Classification Search
CPC ............................. F01D 5/141; F05D 2250/74
USPC ...................... 416/223 R, 242, 243
See application file for complete search history.

(56) References Cited

U.S. PATENT DOCUMENTS

| 6,503,054 | B1 | 1/2003 | Bielek et al. |
| 6,685,434 | B1 | 2/2004 | Humanchuk et al. |
| 6,736,599 | B1 | 5/2004 | Jacks et al. |
| 6,739,838 | B1 | 5/2004 | Bielek et al. |
| 6,779,980 | B1 | 8/2004 | Brittingham et al. |
| 7,527,473 | B2 | 5/2009 | Humanchuk et al. |
| 7,731,483 | B2 | 6/2010 | DeLong et al. |
| 8,070,428 | B2 | 12/2011 | Bielek et al. |
| 8,313,291 | B2 | 11/2012 | Mariotti et al. |
| 8,714,930 | B2* | 5/2014 | Herzlinger ............... F01D 5/14 416/223 R |
| 8,734,116 | B2* | 5/2014 | Smith ..................... F01D 5/142 415/191 |
| 8,807,950 | B2 | 8/2014 | Bielek et al. |
| 8,814,511 | B2* | 8/2014 | Check ..................... F01D 5/141 415/191 |
| 8,882,456 | B2* | 11/2014 | Lanese .................... F01D 5/141 415/193 |
| 9,322,282 | B2 | 4/2016 | Chouhan et al. |
| 10,041,503 | B2* | 8/2018 | McKeever ............ F04D 29/544 |
| 10,215,189 | B2* | 2/2019 | Dutka .................... F04D 29/544 |
| 10,233,759 | B2* | 3/2019 | Blohm ................... F04D 29/324 |
| 10,247,007 | B2* | 4/2019 | Ristau .................... F01D 5/141 |

(Continued)

*Primary Examiner* — Sizo B Vilakazi
*Assistant Examiner* — Brian R Kirby
(74) *Attorney, Agent, or Firm* — Dority & Manning, P.A.

(57) ABSTRACT

A turbine rotor blade is provided including an airfoil having an airfoil shape. The airfoil shape having a nominal profile substantially in accordance with Cartesian coordinate values of X, Y and Z set forth in Table I wherein the Cartesian coordinate values of X, Y and Z are non-dimensional values from 0% to 100% convertible to dimensional distances in inches by multiplying the Cartesian coordinate values of X, Y and Z by a height of the airfoil in inches, and wherein X and Y are distances in inches which, when connected by smooth continuing arcs, define airfoil profile sections at each distance Z, the airfoil profile sections at Z distances being joined smoothly with one another to form a complete airfoil shape.

20 Claims, 2 Drawing Sheets

(56) References Cited

U.S. PATENT DOCUMENTS

| | | | |
|---|---|---|---|
| 10,287,886 B2* | 5/2019 | Delvernois | F04D 29/324 |
| 10,287,888 B2* | 5/2019 | Man | F01D 5/141 |
| 2008/0101950 A1* | 5/2008 | Noshi | F01D 5/141 |
| | | | 416/223 R |
| 2014/0015081 A1 | 1/2014 | Luhta et al. | |
| 2017/0067482 A1* | 3/2017 | Valliappan | F04D 29/544 |

* cited by examiner

AIRFOIL SHAPE FOR A TURBINE ROTOR BLADE

FIELD

The present invention relates to an airfoil for a turbine rotor blade of a stage of a turbine and particularly relates to a shape defining a profile for an airfoil of a turbine rotor blade.

BACKGROUND

Some aircraft and/or power plant systems, for example certain jet aircraft, nuclear, simple cycle and combined cycle power plant systems, employ turbines (also referred to as turbomachines) in their design and operation. Some of these turbines employ airfoils (e.g., stator vanes or nozzles and rotor blades) which during operation are exposed to fluid flows. These airfoils are configured to aerodynamically interact with the fluid flows and generate energy (e.g., creating thrust, turning kinetic energy to mechanical energy, thermal energy to mechanical energy, etc.) from these fluid flows as part of power generation. As a result of this interaction and conversion, the aerodynamic characteristics and losses of these airfoils have an impact on system and turbine operation, performance, thrust, efficiency, and power.

BRIEF DESCRIPTION

Aspects and advantages are set forth below in the following description, or may be obvious from the description, or may be learned through practice.

An aspect of the present invention may be embodied by a turbine rotor blade including an airfoil having an airfoil shape, the airfoil having a nominal profile substantially in accordance with Cartesian coordinate values of X, Y and Z set forth in Table I wherein the Cartesian coordinate values of X, Y and Z are non-dimensional values from 0% to 100% convertible to dimensional distances in inches by multiplying the Cartesian coordinate values of X, Y and Z by a height of the airfoil in inches, and wherein X and Y are distances in inches which, when connected by smooth continuing arcs, define airfoil profile sections at each distance Z, the airfoil profile sections at Z distances being joined smoothly with one another to form a complete airfoil shape.

An aspect of the present invention may be embodied in a turbine rotor blade including an airfoil having a suction-side uncoated nominal airfoil profile substantially in accordance with suction-side Cartesian coordinate values of X, Y and Z set forth in Table I wherein the Cartesian coordinate values of X, Y and Z are non-dimensional values from 0% to 100% convertible to dimensional distances in inches by multiplying the Cartesian coordinate values of X, Y and Z by a height of the airfoil in inches, and wherein X and Y are distances in inches which, when connected by smooth continuing arcs, define airfoil profile sections at each Z distance, the airfoil profile sections at the Z distances being joined smoothly with one another to form a complete suction-side airfoil shape, the X, Y and Z distances being scalable as a function of the same constant or number to provide a scaled-up or scaled-down airfoil.

An aspect of the present invention may be embodied in a turbine comprising a turbine wheel having a plurality of turbine rotor blades, each of the turbine rotor blades including an airfoil having a suction-side airfoil shape, the airfoil having a nominal profile substantially in accordance with suction-side Cartesian coordinate values of X, Y and Z set forth in Table I wherein the Cartesian coordinate values of X, Y and Z are non-dimensional values from 0% to 100% convertible to dimensional distances by multiplying the Cartesian coordinate values of X, Y and Z by a height of the airfoil, and wherein X and Y are distances which, when connected by smooth continuing arcs, define airfoil profile sections at each Z distance, the airfoil profile sections at the Z distances being joined smoothly with one another to form a complete suction-side airfoil shape.

Those of ordinary skill in the art will better appreciate the features and aspects of such embodiments, and others, upon review of the specification.

BRIEF DESCRIPTION OF THE DRAWINGS

A full and enabling disclosure of various embodiments, including the best mode thereof to one skilled in the art, is set forth more particularly in the remainder of the specification, including reference to the accompanying figures, in which.

DETAILED DESCRIPTION

Figure 1:
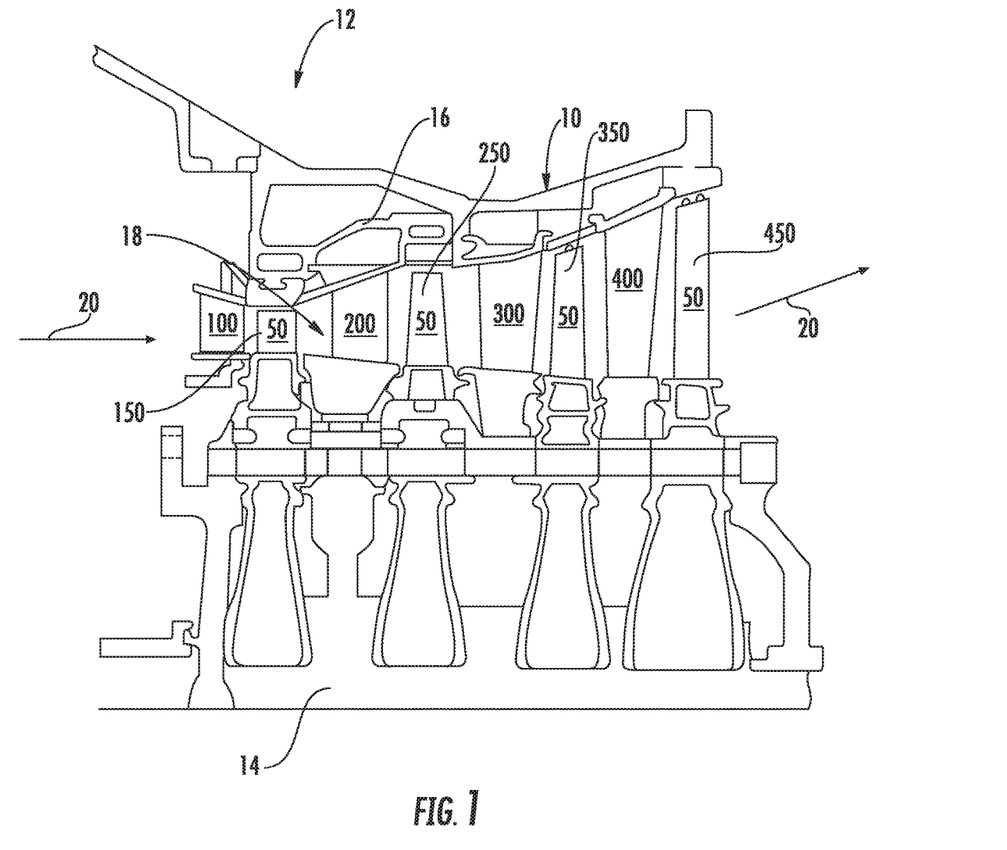
FIG. 1 is a schematic representation of an exemplary turbine having multiple stages with each stage including alternating rows of turbine rotor blades and stationary vanes or nozzles according to at least one embodiment of the present disclosure.

Referring now to the drawings, particularly to FIG. 1, there is illustrated an exemplary turbine 10 of a gas turbine 12 including a plurality of turbine stages arranged in serial flow order. Each stage of the turbine includes a row of turbine nozzles or vanes disposed axially adjacent to a corresponding row of turbine rotor blades. Four stages are illustrated in FIG. 1. The exact number of stages of the turbine 10 is a choice of engineering design, and may be more or less than the four stages illustrated in FIG. 1. The four stages are merely exemplary of one turbine design, and are not intended to limit the presently claimed turbine rotor blade in any manner.

The first stage comprises a plurality of turbine nozzles or vanes 100 and a plurality of turbine rotor blades 150. The turbine nozzles 100 are annularly arranged about an axis of a turbine rotor 14. The turbine rotor blades 150 are annularly arranged about and coupled to the turbine rotor 14. A second stage of the turbine 12 includes a plurality of turbine nozzles 200 annularly arranged about the axis of the turbine rotor 14 and a plurality of turbine rotor blades 250 annularly arranged about and coupled to the turbine rotor 14. The turbine nozzles 200 may be coupled to a casing 16 of the turbine 12.

As shown in FIG. 1, a third stage of the turbine 12 includes a plurality of turbine nozzles 300 annularly arranged about the axis of the turbine rotor 14 and a plurality of turbine rotor blades 350 annularly arranged about and coupled to the turbine rotor 14. The turbine nozzles 300 may be coupled to the casing 16 of the turbine 12. In particular embodiments, the turbine 12 includes a fourth stage which includes plurality of turbine nozzles 400 annularly arranged about the axis of the turbine rotor 14 and a plurality of turbine rotor blades 450 annularly arranged about and coupled to the turbine rotor 14. The fourth stage turbine nozzles 400 may be coupled to the casing 16 of the turbine 12.

It will be appreciated that the turbine nozzles 100, 200, 300 and 400 and turbine rotor blades 150, 250, 350 and 450 are disposed or at least partially disposed within a hot gas path 18 of the turbine 12. The various stages of the turbine 10 at least partially define the hot gas path 18 through which combustion gases, as indicated by arrows 20, flow during operation of the gas turbine 12.

Figure 2:
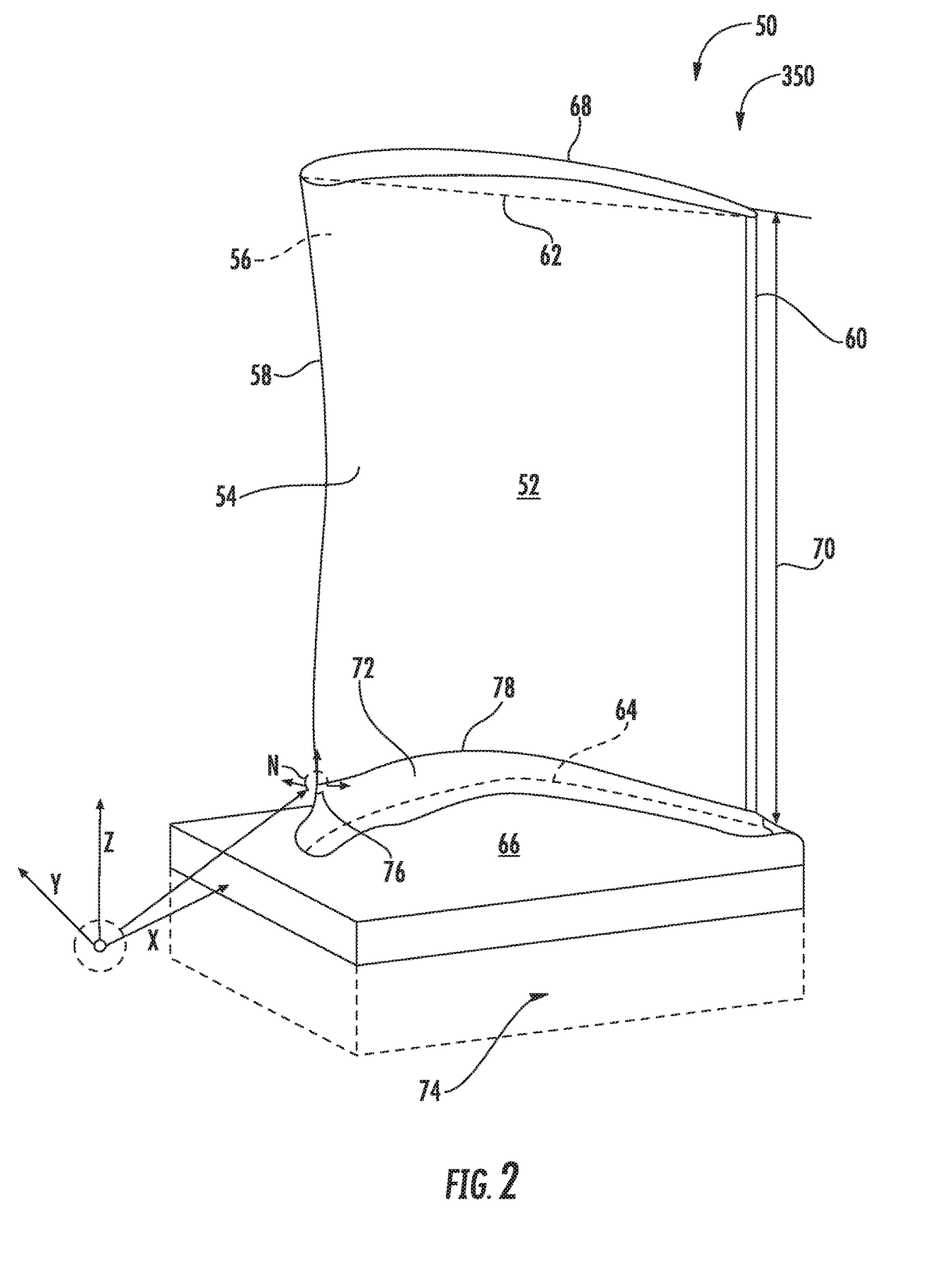
FIG. 2 is a perspective view of a turbine rotor blade according to at least one embodiment of the present disclosure.

FIG. 2 provides a perspective view of an exemplary turbine rotor blade 50 as may be incorporated in any stage of the turbine 12. For example, in one embodiment the turbine rotor blade 50 as presented in Table I below is representative of a turbine rotor blade 350 of the plurality of turbine rotor blades 350 of the third stage. As shown in FIG. 2, the turbine rotor blade 50 includes an airfoil 52 having a pressure-side wall 54 and an opposing suction-side wall 56. The pressure-side wall 54 and the suction-side wall 56 meet or intersect at a leading edge 58 and a trailing edge 60 of the airfoil 52. A chord line 62 extends between the leading edge 58 and the trailing edge 60 such that pressure and suction-side walls 54, 56 can be said to extend in chord or chordwise between the leading edge 58 and the trailing edge 60.

The airfoil 52 includes a root or first end 64 which intersects with and extends radially outwardly from a base or platform 66 of the turbine rotor blade 50. The airfoil 52 terminates radially at a second end or radial tip 68 of the airfoil 52. The pressure and suction-side walls 54, 56 can be said to extend in span or in a span-wise direction 70 between the root 64 and/or the platform 66 and the radial tip 68 of the airfoil 52. In other words, each turbine rotor blade 50 includes an airfoil 52 having opposing pressure and suction-side walls 54, 56 that extend in chord or chordwise 62 between opposing leading and trailing edges 58, 60 and that extend in span or span-wise 70 between the root 64 and the radial tip 68 of the airfoil 52.

In particular configurations, the airfoil 52 may include a fillet 72 formed between the platform 66 and the airfoil 52 proximate to the root 64. The fillet 72 can include a weld or braze fillet, which can be formed via conventional MIG welding, TIG welding, brazing, etc., and can include a profile that can reduce fluid dynamic losses as a result of the presence of fillet 72. In particular embodiments, the platform 66, airfoil 52 and the fillet 72 can be formed as a single component, such as by casting and/or machining and/or 3D printing and/or any other suitable technique now known or later developed and/or discovered. In particular configurations, the turbine rotor blade 50 includes a mounting portion 74 which is formed to connect and/or to secure the turbine rotor blade 50 to the rotor shaft 14.

The airfoil 52 of the turbine rotor blade 50 has a profile at any cross-section taken between the platform 66 or the root 64 and the radial tip 68. The X, Y, and Z values are given in Table I as percentage values of the airfoil length or height/span. As one example only, the height or radial span of the airfoil 52 of turbine rotor blade 50 may be from about 10 inches to about 40 inches. However, it is to be understood that heights below or above this range may also be employed as desired in the specific application.

A gas turbine hot gas path requires airfoils that meet system requirements of aerodynamic and mechanical blade loading and efficiency. To define the airfoil shape of each turbine rotor blade airfoil, there is a unique set or loci of points in space that meet the stage requirements and that can be manufactured. This unique loci of points meets the requirements for stage efficiency and are arrived at by iteration between aerodynamic and mechanical loadings enabling the turbine to run in an efficient, safe and smooth manner. These points are unique and specific to the system and are not obvious to those skilled in the art.

The loci which defines the airfoil profile of turbine rotor blade 50 comprises a set of about 2,200 points with X, Y and Z dimensions relative to a reference origin coordinate system. The Cartesian coordinate system of X, Y and Z values given in Table I below defines the airfoil profile of the turbine rotor blade 50 at various locations along its length and height or radial span. Table I lists data for a non-coated airfoil, and the envelope/tolerance for the coordinates is about +/−5% in a direction normal to any airfoil surface location. A point data origin 76 is defined at or proximate to the root 64 at the leading edge 58. In one embodiment as presented in Table I below, the point data origin 76 is defined at or proximate to (above or below) a transition or intersection line 78 defined between the fillet 72 and the airfoil 52. The point data origin 76 corresponds to the non-dimensional Z value of Table I (presented below) at Z equals 0.

The coordinate values for the X, Y and Z coordinates are set forth in non-dimensionalized units by the airfoil height in Table I although other units of dimensions may be used when the values are appropriately converted. The X, Y, and Z values set forth in Table I are also expressed in non-dimensional form (X, Y, and Z) from 0% to 100% of the airfoil 52 height or radial span 70. To convert the Z value to a Z coordinate value, e.g., in inches, the non-dimensional Z value given in Table I is multiplied by the Z length of the airfoil in inches. As described above, the Cartesian coordinate system has orthogonally-related X, Y and Z axes and the X axis lies generally parallel to a centerline of the rotor shaft 14, i.e., the rotary axis and a positive X coordinate value is axial toward an aft, i.e., exhaust end of the turbine 10. The positive Y coordinate value extends tangentially in the direction of rotation of the rotor and the positive Z coordinate value is radially outwardly toward the radial tip 68. All the values in Table I are given at room temperature and do not include the fillet 72.

By defining X and Y coordinate values at selected locations in a Z direction normal to the X, Y plane, the profile section or airfoil shape of the airfoil 52 of the turbine rotor blade 50, at each Z distance along the length of the airfoil 52 can be ascertained. By connecting the X and Y values with smooth continuing arcs, each profile section at each distance Z is fixed. The airfoil profiles of the various surface locations between the distances Z are determined by smoothly connecting the adjacent profile sections to one another to form the airfoil profile.

The Table I values are generated and shown to four decimal places for determining the profile of the airfoil 52. As the turbine rotor blade 50 heats up during operation of the gas turbine 12, surface stress and temperature will cause a change in the X, Y and Z's. Accordingly, the values for the profile given in Table I represent ambient, non-operating or non-hot conditions (e.g., room temperature) and are for an uncoated airfoil.

There are typical manufacturing tolerances as well as coatings which must be accounted for in the actual profile of the airfoil 52. Each cross-section is joined smoothly with the other cross-sections to form the complete airfoil shape. It will therefore be appreciated that +/− typical manufacturing tolerances, i.e., +/− values, including any coating thicknesses, are additive to the X and Y values given in Table I below. Accordingly, a distance of +/−5% in a direction normal to any surface location along the airfoil profile defines an airfoil profile envelope for this particular turbine rotor blade 50 airfoil design and turbine 12, i.e., a range of variation between measured points on the actual airfoil surface at nominal cold or room temperature and the ideal position of those points as given in Table I below at the same temperature. The data provided in Table I is scalable and the geometry pertains to all aerodynamic scales, at, above and/or below a 3000-3600 RPM range. The design of the airfoil 52 for turbine rotor blade 50 is robust to this range of variation without impairment of mechanical and aerodynamic functions.

TABLE I

| SUCTION-SIDE | | | | PRESSURE-SIDE | | |
|---|---|---|---|---|---|---|
| X (%) | Y (%) | Z (%) | N | X (%) | Y (%) | Z (%) |
| 0.0000 | 0.0000 | 0.0000 | 1 | 0.0000 | 0.0000 | 0.0000 |
| −0.1741 | 0.3908 | 0.0000 | 2 | 0.2870 | −0.1968 | 0.0000 |
| −0.1254 | 0.8211 | 0.0000 | 3 | 0.6195 | −0.3086 | 0.0000 |
| 0.0400 | 1.2227 | 0.0000 | 4 | 0.9649 | −0.3670 | 0.0000 |
| 0.2676 | 1.5941 | 0.0000 | 5 | 1.3146 | −0.3908 | 0.0000 |
| 0.5324 | 1.9395 | 0.0000 | 6 | 1.6654 | −0.3886 | 0.0000 |
| 0.8232 | 2.2632 | 0.0000 | 7 | 2.0157 | −0.3670 | 0.0000 |
| 1.1341 | 2.5681 | 0.0000 | 8 | 2.3643 | −0.3292 | 0.0000 |
| 1.4584 | 2.8589 | 0.0000 | 9 | 2.7114 | −0.2795 | 0.0000 |
| 1.7924 | 3.1384 | 0.0000 | 10 | 3.0578 | −0.2222 | 0.0000 |
| 2.1357 | 3.4070 | 0.0000 | 11 | 3.4032 | −0.1611 | 0.0000 |
| 2.4849 | 3.6665 | 0.0000 | 12 | 3.7481 | −0.0989 | 0.0000 |
| 2.8405 | 3.9178 | 0.0000 | 13 | 4.0935 | −0.0378 | 0.0000 |
| 3.2016 | 4.1622 | 0.0000 | 14 | 4.4395 | 0.0216 | 0.0000 |
| 3.5665 | 4.3995 | 0.0000 | 15 | 4.7854 | 0.0784 | 0.0000 |
| 3.9357 | 4.6303 | 0.0000 | 16 | 5.1319 | 0.1335 | 0.0000 |
| 4.3086 | 4.8557 | 0.0000 | 17 | 5.4789 | 0.1859 | 0.0000 |
| 4.6849 | 5.0751 | 0.0000 | 18 | 5.8259 | 0.2368 | 0.0000 |
| 5.0643 | 5.2881 | 0.0000 | 19 | 6.1735 | 0.2849 | 0.0000 |
| 5.4470 | 5.4962 | 0.0000 | 20 | 6.5211 | 0.3314 | 0.0000 |
| 5.8330 | 5.6978 | 0.0000 | 21 | 6.8692 | 0.3757 | 0.0000 |
| 6.2222 | 5.8935 | 0.0000 | 22 | 7.2173 | 0.4184 | 0.0000 |
| 6.6141 | 6.0832 | 0.0000 | 23 | 7.5654 | 0.4584 | 0.0000 |
| 7.0092 | 6.2665 | 0.0000 | 24 | 7.9141 | 0.4968 | 0.0000 |
| 7.4076 | 6.4427 | 0.0000 | 25 | 8.2632 | 0.5330 | 0.0000 |
| 7.8086 | 6.6119 | 0.0000 | 26 | 8.6124 | 0.5670 | 0.0000 |
| 8.2130 | 6.7735 | 0.0000 | 27 | 8.9616 | 0.5984 | 0.0000 |
| 8.6205 | 6.9276 | 0.0000 | 28 | 9.3114 | 0.6276 | 0.0000 |
| 9.0308 | 7.0735 | 0.0000 | 29 | 9.6611 | 0.6546 | 0.0000 |
| 9.4438 | 7.2114 | 0.0000 | 30 | 10.0108 | 0.6784 | 0.0000 |
| 9.8600 | 7.3400 | 0.0000 | 31 | 10.3611 | 0.7000 | 0.0000 |
| 10.2784 | 7.4600 | 0.0000 | 32 | 10.7114 | 0.7189 | 0.0000 |
| 10.7000 | 7.5703 | 0.0000 | 33 | 11.0616 | 0.7346 | 0.0000 |
| 11.1238 | 7.6708 | 0.0000 | 34 | 11.4124 | 0.7476 | 0.0000 |
| 11.5497 | 7.7611 | 0.0000 | 35 | 11.7627 | 0.7573 | 0.0000 |
| 11.9778 | 7.8411 | 0.0000 | 36 | 12.1135 | 0.7643 | 0.0000 |
| 12.4076 | 7.9103 | 0.0000 | 37 | 12.4643 | 0.7681 | 0.0000 |
| 12.8395 | 7.9681 | 0.0000 | 38 | 12.8151 | 0.7681 | 0.0000 |
| 13.2724 | 8.0146 | 0.0000 | 39 | 13.1659 | 0.7654 | 0.0000 |
| 13.7065 | 8.0486 | 0.0000 | 40 | 13.5168 | 0.7589 | 0.0000 |
| 14.1416 | 8.0708 | 0.0000 | 41 | 13.8676 | 0.7486 | 0.0000 |
| 14.5768 | 8.0800 | 0.0000 | 42 | 14.2178 | 0.7351 | 0.0000 |
| 15.0124 | 8.0762 | 0.0000 | 43 | 14.5681 | 0.7178 | 0.0000 |
| 15.4476 | 8.0600 | 0.0000 | 44 | 14.9184 | 0.6968 | 0.0000 |
| 15.8822 | 8.0297 | 0.0000 | 45 | 15.2681 | 0.6714 | 0.0000 |
| 16.3151 | 7.9859 | 0.0000 | 46 | 15.6178 | 0.6427 | 0.0000 |
| 16.7470 | 7.9286 | 0.0000 | 47 | 15.9670 | 0.6092 | 0.0000 |
| 17.1768 | 7.8573 | 0.0000 | 48 | 16.3157 | 0.5719 | 0.0000 |
| 17.6038 | 7.7719 | 0.0000 | 49 | 16.6638 | 0.5303 | 0.0000 |
| 18.0276 | 7.6724 | 0.0000 | 50 | 17.0119 | 0.4838 | 0.0000 |
| 18.4481 | 7.5589 | 0.0000 | 51 | 17.3589 | 0.4335 | 0.0000 |
| 18.8643 | 7.4319 | 0.0000 | 52 | 17.7054 | 0.3778 | 0.0000 |
| 19.2768 | 7.2908 | 0.0000 | 53 | 18.0508 | 0.3178 | 0.0000 |
| 19.6832 | 7.1357 | 0.0000 | 54 | 18.3957 | 0.2530 | 0.0000 |
| 20.0849 | 6.9670 | 0.0000 | 55 | 18.7395 | 0.1827 | 0.0000 |
| 20.4805 | 6.7854 | 0.0000 | 56 | 19.0822 | 0.1081 | 0.0000 |
| 20.8697 | 6.5897 | 0.0000 | 57 | 19.4232 | 0.0281 | 0.0000 |
| 21.2524 | 6.3822 | 0.0000 | 58 | 19.7638 | −0.0573 | 0.0000 |
| 21.6281 | 6.1611 | 0.0000 | 59 | 20.1027 | −0.1476 | 0.0000 |
| 21.9962 | 5.9286 | 0.0000 | 60 | 20.4400 | −0.2432 | 0.0000 |
| 22.3568 | 5.6843 | 0.0000 | 61 | 20.7762 | −0.3443 | 0.0000 |
| 22.7092 | 5.4286 | 0.0000 | 62 | 21.1103 | −0.4514 | 0.0000 |
| 23.0535 | 5.1622 | 0.0000 | 63 | 21.4427 | −0.5632 | 0.0000 |
| 23.3903 | 4.8854 | 0.0000 | 64 | 21.7730 | −0.6811 | 0.0000 |
| 23.7184 | 4.5995 | 0.0000 | 65 | 22.1016 | −0.8043 | 0.0000 |
| 24.0389 | 4.3043 | 0.0000 | 66 | 22.4276 | −0.9330 | 0.0000 |
| 24.3514 | 4.0011 | 0.0000 | 67 | 22.7514 | −1.0681 | 0.0000 |
| 24.6562 | 3.6903 | 0.0000 | 68 | 23.0730 | −1.2086 | 0.0000 |
| 24.9535 | 3.3724 | 0.0000 | 69 | 23.3914 | −1.3551 | 0.0000 |
| 25.2438 | 3.0476 | 0.0000 | 70 | 23.7076 | −1.5070 | 0.0000 |
| 25.5270 | 2.7168 | 0.0000 | 71 | 24.0205 | −1.6654 | 0.0000 |
| 25.8038 | 2.3805 | 0.0000 | 72 | 24.3308 | −1.8292 | 0.0000 |
| 26.0741 | 2.0389 | 0.0000 | 73 | 24.6378 | −1.9989 | 0.0000 |
| 26.3384 | 1.6930 | 0.0000 | 74 | 24.9416 | −2.1741 | 0.0000 |
| 26.5973 | 1.3427 | 0.0000 | 75 | 25.2422 | −2.3551 | 0.0000 |
| 26.8508 | 0.9886 | 0.0000 | 76 | 25.5395 | −2.5411 | 0.0000 |
| 27.0995 | 0.6308 | 0.0000 | 77 | 25.8335 | −2.7330 | 0.0000 |
| 27.3432 | 0.2697 | 0.0000 | 78 | 26.1238 | −2.9297 | 0.0000 |
| 27.5827 | −0.0941 | 0.0000 | 79 | 26.4097 | −3.1330 | 0.0000 |
| 27.8178 | −0.4600 | 0.0000 | 80 | 26.6914 | −3.3416 | 0.0000 |
| 28.0497 | −0.8292 | 0.0000 | 81 | 26.9686 | −3.5568 | 0.0000 |
| 28.2778 | −1.2000 | 0.0000 | 82 | 27.2405 | −3.7778 | 0.0000 |
| 28.5032 | −1.5730 | 0.0000 | 83 | 27.5076 | −4.0054 | 0.0000 |
| 28.7254 | −1.9470 | 0.0000 | 84 | 27.7692 | −4.2395 | 0.0000 |
| 28.9449 | −2.3232 | 0.0000 | 85 | 28.0249 | −4.4795 | 0.0000 |
| 29.1622 | −2.7005 | 0.0000 | 86 | 28.2751 | −4.7249 | 0.0000 |
| 29.3773 | −3.0795 | 0.0000 | 87 | 28.5205 | −4.9762 | 0.0000 |
| 29.5903 | −3.4595 | 0.0000 | 88 | 28.7600 | −5.2324 | 0.0000 |
| 29.8011 | −3.8400 | 0.0000 | 89 | 28.9946 | −5.4930 | 0.0000 |
| 30.0103 | −4.2227 | 0.0000 | 90 | 29.2238 | −5.7584 | 0.0000 |
| 30.2168 | −4.6059 | 0.0000 | 91 | 29.4481 | −6.0281 | 0.0000 |
| 30.4211 | −4.9903 | 0.0000 | 92 | 29.6676 | −6.3016 | 0.0000 |
| 30.6227 | −5.3762 | 0.0000 | 93 | 29.8827 | −6.5789 | 0.0000 |
| 30.8216 | −5.7638 | 0.0000 | 94 | 30.0924 | −6.8600 | 0.0000 |
| 31.0173 | −6.1530 | 0.0000 | 95 | 30.2984 | −7.1443 | 0.0000 |
| 31.2097 | −6.5438 | 0.0000 | 96 | 30.5000 | −7.4314 | 0.0000 |
| 31.3984 | −6.9362 | 0.0000 | 97 | 30.6978 | −7.7211 | 0.0000 |
| 31.5832 | −7.3303 | 0.0000 | 98 | 30.8924 | −8.0124 | 0.0000 |
| 31.7205 | −7.7395 | 0.0000 | 99 | 31.1854 | −8.1886 | 0.0000 |
| 31.5184 | −8.1059 | 0.0000 | 100 | 31.5184 | −8.1059 | 0.0000 |
| 0.9335 | 0.8270 | 10.0000 | 1 | 0.9335 | 0.8270 | 10.0000 |
| 0.8205 | 1.2238 | 10.0000 | 2 | 1.1957 | 0.6103 | 10.0000 |
| 0.9189 | 1.6308 | 10.0000 | 3 | 1.5157 | 0.4897 | 10.0000 |
| 1.1146 | 2.0027 | 10.0000 | 4 | 1.8530 | 0.4276 | 10.0000 |
| 1.3573 | 2.3465 | 10.0000 | 5 | 2.1946 | 0.4027 | 10.0000 |
| 1.6292 | 2.6676 | 10.0000 | 6 | 2.5378 | 0.4032 | 10.0000 |
| 1.9211 | 2.9708 | 10.0000 | 7 | 2.8800 | 0.4243 | 10.0000 |
| 2.2270 | 3.2595 | 10.0000 | 8 | 3.2205 | 0.4627 | 10.0000 |
| 2.5438 | 3.5362 | 10.0000 | 9 | 3.5600 | 0.5130 | 10.0000 |
| 2.8697 | 3.8022 | 10.0000 | 10 | 3.8978 | 0.5708 | 10.0000 |
| 3.2038 | 4.0589 | 10.0000 | 11 | 4.2357 | 0.6314 | 10.0000 |
| 3.5438 | 4.3065 | 10.0000 | 12 | 4.5730 | 0.6924 | 10.0000 |
| 3.8892 | 4.5465 | 10.0000 | 13 | 4.9108 | 0.7524 | 10.0000 |
| 4.2400 | 4.7789 | 10.0000 | 14 | 5.2486 | 0.8097 | 10.0000 |
| 4.5951 | 5.0049 | 10.0000 | 15 | 5.5870 | 0.8643 | 10.0000 |
| 4.9546 | 5.2238 | 10.0000 | 16 | 5.9265 | 0.9157 | 10.0000 |
| 5.3173 | 5.4368 | 10.0000 | 17 | 6.2659 | 0.9643 | 10.0000 |
| 5.6843 | 5.6438 | 10.0000 | 18 | 6.6054 | 1.0108 | 10.0000 |
| 6.0541 | 5.8443 | 10.0000 | 19 | 6.9454 | 1.0546 | 10.0000 |
| 6.4270 | 6.0389 | 10.0000 | 20 | 7.2859 | 1.0962 | 10.0000 |
| 6.8038 | 6.2265 | 10.0000 | 21 | 7.6265 | 1.1357 | 10.0000 |
| 7.1838 | 6.4076 | 10.0000 | 22 | 7.9676 | 1.1724 | 10.0000 |
| 7.5670 | 6.5816 | 10.0000 | 23 | 8.3086 | 1.2070 | 10.0000 |
| 7.9535 | 6.7481 | 10.0000 | 24 | 8.6503 | 1.2384 | 10.0000 |
| 8.3432 | 6.9070 | 10.0000 | 25 | 8.9919 | 1.2676 | 10.0000 |
| 8.7362 | 7.0578 | 10.0000 | 26 | 9.3341 | 1.2930 | 10.0000 |
| 9.1319 | 7.2005 | 10.0000 | 27 | 9.6762 | 1.3157 | 10.0000 |
| 9.5308 | 7.3346 | 10.0000 | 28 | 10.0184 | 1.3346 | 10.0000 |
| 9.9330 | 7.4595 | 10.0000 | 29 | 10.3611 | 1.3508 | 10.0000 |
| 10.3373 | 7.5751 | 10.0000 | 30 | 10.7038 | 1.3638 | 10.0000 |
| 10.7449 | 7.6805 | 10.0000 | 31 | 11.0465 | 1.3730 | 10.0000 |
| 11.1546 | 7.7762 | 10.0000 | 32 | 11.3897 | 1.3795 | 10.0000 |
| 11.5665 | 7.8611 | 10.0000 | 33 | 11.7324 | 1.3827 | 10.0000 |
| 11.9811 | 7.9351 | 10.0000 | 34 | 12.0757 | 1.3822 | 10.0000 |
| 12.3973 | 7.9978 | 10.0000 | 35 | 12.4184 | 1.3778 | 10.0000 |
| 12.8146 | 8.0486 | 10.0000 | 36 | 12.7611 | 1.3692 | 10.0000 |
| 13.2341 | 8.0876 | 10.0000 | 37 | 13.1038 | 1.3568 | 10.0000 |
| 13.6541 | 8.1141 | 10.0000 | 38 | 13.4465 | 1.3405 | 10.0000 |

TABLE I-continued

| SUCTION-SIDE | | | | PRESSURE-SIDE | | |
|---|---|---|---|---|---|---|
| X (%) | Y (%) | Z (%) | N | X (%) | Y (%) | Z (%) |
| 14.0746 | 8.1276 | 10.0000 | 39 | 13.7886 | 1.3200 | 10.0000 |
| 14.4951 | 8.1276 | 10.0000 | 40 | 14.1308 | 1.2957 | 10.0000 |
| 14.9157 | 8.1146 | 10.0000 | 41 | 14.4724 | 1.2670 | 10.0000 |
| 15.3357 | 8.0881 | 10.0000 | 42 | 14.8141 | 1.2341 | 10.0000 |
| 15.7546 | 8.0476 | 10.0000 | 43 | 15.1546 | 1.1968 | 10.0000 |
| 16.1719 | 7.9935 | 10.0000 | 44 | 15.4951 | 1.1546 | 10.0000 |
| 16.5870 | 7.9254 | 10.0000 | 45 | 15.8346 | 1.1076 | 10.0000 |
| 17.0000 | 7.8427 | 10.0000 | 46 | 16.1741 | 1.0562 | 10.0000 |
| 17.4097 | 7.7465 | 10.0000 | 47 | 16.5119 | 1.0000 | 10.0000 |
| 17.8157 | 7.6357 | 10.0000 | 48 | 16.8497 | 0.9384 | 10.0000 |
| 18.2178 | 7.5119 | 10.0000 | 49 | 17.1859 | 0.8724 | 10.0000 |
| 18.6151 | 7.3741 | 10.0000 | 50 | 17.5216 | 0.8011 | 10.0000 |
| 19.0081 | 7.2227 | 10.0000 | 51 | 17.8557 | 0.7249 | 10.0000 |
| 19.3951 | 7.0584 | 10.0000 | 52 | 18.1886 | 0.6432 | 10.0000 |
| 19.7768 | 6.8811 | 10.0000 | 53 | 18.5205 | 0.5568 | 10.0000 |
| 20.1524 | 6.6908 | 10.0000 | 54 | 18.8508 | 0.4643 | 10.0000 |
| 20.5216 | 6.4886 | 10.0000 | 55 | 19.1800 | 0.3670 | 10.0000 |
| 20.8838 | 6.2746 | 10.0000 | 56 | 19.5070 | 0.2649 | 10.0000 |
| 21.2395 | 6.0492 | 10.0000 | 57 | 19.8324 | 0.1568 | 10.0000 |
| 21.5876 | 5.8130 | 10.0000 | 58 | 20.1562 | 0.0432 | 10.0000 |
| 21.9281 | 5.5659 | 10.0000 | 59 | 20.4778 | −0.0751 | 10.0000 |
| 22.2611 | 5.3086 | 10.0000 | 60 | 20.7978 | −0.1995 | 10.0000 |
| 22.5865 | 5.0416 | 10.0000 | 61 | 21.1151 | −0.3292 | 10.0000 |
| 22.9038 | 4.7654 | 10.0000 | 62 | 21.4303 | −0.4638 | 10.0000 |
| 23.2135 | 4.4805 | 10.0000 | 63 | 21.7432 | −0.6043 | 10.0000 |
| 23.5162 | 4.1881 | 10.0000 | 64 | 22.0535 | −0.7503 | 10.0000 |
| 23.8124 | 3.8892 | 10.0000 | 65 | 22.3616 | −0.9011 | 10.0000 |
| 24.1016 | 3.5832 | 10.0000 | 66 | 22.6670 | −1.0573 | 10.0000 |
| 24.3843 | 3.2714 | 10.0000 | 67 | 22.9692 | −1.2195 | 10.0000 |
| 24.6605 | 2.9541 | 10.0000 | 68 | 23.2686 | −1.3865 | 10.0000 |
| 24.9303 | 2.6314 | 10.0000 | 69 | 23.5654 | −1.5584 | 10.0000 |
| 25.1946 | 2.3032 | 10.0000 | 70 | 23.8584 | −1.7362 | 10.0000 |
| 25.4530 | 1.9714 | 10.0000 | 71 | 24.1486 | −1.9189 | 10.0000 |
| 25.7070 | 1.6357 | 10.0000 | 72 | 24.4357 | −2.1065 | 10.0000 |
| 25.9562 | 1.2968 | 10.0000 | 73 | 24.7195 | −2.2989 | 10.0000 |
| 26.2016 | 0.9551 | 10.0000 | 74 | 25.0005 | −2.4962 | 10.0000 |
| 26.4432 | 0.6103 | 10.0000 | 75 | 25.2778 | −2.6973 | 10.0000 |
| 26.6800 | 0.2627 | 10.0000 | 76 | 25.5519 | −2.9032 | 10.0000 |
| 26.9130 | −0.0881 | 10.0000 | 77 | 25.8227 | −3.1141 | 10.0000 |
| 27.1416 | −0.4416 | 10.0000 | 78 | 26.0903 | −3.3286 | 10.0000 |
| 27.3659 | −0.7973 | 10.0000 | 79 | 26.3535 | −3.5481 | 10.0000 |
| 27.5865 | −1.1557 | 10.0000 | 80 | 26.6130 | −3.7724 | 10.0000 |
| 27.8038 | −1.5162 | 10.0000 | 81 | 26.8681 | −4.0016 | 10.0000 |
| 28.0184 | −1.8784 | 10.0000 | 82 | 27.1184 | −4.2362 | 10.0000 |
| 28.2308 | −2.2416 | 10.0000 | 83 | 27.3643 | −4.4751 | 10.0000 |
| 28.4416 | −2.6059 | 10.0000 | 84 | 27.6049 | −4.7195 | 10.0000 |
| 28.6508 | −2.9708 | 10.0000 | 85 | 27.8405 | −4.9686 | 10.0000 |
| 28.8584 | −3.3368 | 10.0000 | 86 | 28.0719 | −5.2222 | 10.0000 |
| 29.0649 | −3.7038 | 10.0000 | 87 | 28.2978 | −5.4800 | 10.0000 |
| 29.2697 | −4.0714 | 10.0000 | 88 | 28.5195 | −5.7416 | 10.0000 |
| 29.4735 | −4.4395 | 10.0000 | 89 | 28.7368 | −6.0065 | 10.0000 |
| 29.6751 | −4.8086 | 10.0000 | 90 | 28.9503 | −6.2751 | 10.0000 |
| 29.8751 | −5.1789 | 10.0000 | 91 | 29.1600 | −6.5465 | 10.0000 |
| 30.0730 | −5.5508 | 10.0000 | 92 | 29.3659 | −6.8205 | 10.0000 |
| 30.2686 | −5.9232 | 10.0000 | 93 | 29.5686 | −7.0973 | 10.0000 |
| 30.4622 | −6.2973 | 10.0000 | 94 | 29.7670 | −7.3768 | 10.0000 |
| 30.6524 | −6.6724 | 10.0000 | 95 | 29.9627 | −7.6584 | 10.0000 |
| 30.8405 | −7.0486 | 10.0000 | 96 | 30.1551 | −7.9427 | 10.0000 |
| 31.0249 | −7.4270 | 10.0000 | 97 | 30.3443 | −8.2286 | 10.0000 |
| 31.2065 | −7.8065 | 10.0000 | 98 | 30.5362 | −8.5124 | 10.0000 |
| 31.3427 | −8.2005 | 10.0000 | 99 | 30.8357 | −8.6605 | 10.0000 |
| 31.1568 | −8.5611 | 10.0000 | 100 | 31.1568 | −8.5611 | 10.0000 |
| 1.7670 | 1.6443 | 20.0000 | 1 | 1.7670 | 1.6443 | 20.0000 |
| 1.6903 | 2.0373 | 20.0000 | 2 | 2.0108 | 1.4184 | 20.0000 |
| 1.8086 | 2.4259 | 20.0000 | 3 | 2.3211 | 1.2930 | 20.0000 |
| 2.0124 | 2.7795 | 20.0000 | 4 | 2.6503 | 1.2297 | 20.0000 |
| 2.2584 | 3.1049 | 20.0000 | 5 | 2.9843 | 1.2022 | 20.0000 |
| 2.5303 | 3.4092 | 20.0000 | 6 | 3.3200 | 1.2000 | 20.0000 |
| 2.8200 | 3.6962 | 20.0000 | 7 | 3.6546 | 1.2195 | 20.0000 |
| 3.1232 | 3.9692 | 20.0000 | 8 | 3.9881 | 1.2573 | 20.0000 |
| 3.4368 | 4.2303 | 20.0000 | 9 | 4.3200 | 1.3065 | 20.0000 |
| 3.7589 | 4.4811 | 20.0000 | 10 | 4.6508 | 1.3622 | 20.0000 |
| 4.0876 | 4.7227 | 20.0000 | 11 | 4.9811 | 1.4205 | 20.0000 |
| 4.4227 | 4.9557 | 20.0000 | 12 | 5.3119 | 1.4784 | 20.0000 |
| 4.7632 | 5.1811 | 20.0000 | 13 | 5.6427 | 1.5346 | 20.0000 |
| 5.1081 | 5.3989 | 20.0000 | 14 | 5.9735 | 1.5881 | 20.0000 |
| 5.4573 | 5.6103 | 20.0000 | 15 | 6.3054 | 1.6389 | 20.0000 |
| 5.8103 | 5.8151 | 20.0000 | 16 | 6.6378 | 1.6859 | 20.0000 |
| 6.1670 | 6.0135 | 20.0000 | 17 | 6.9703 | 1.7303 | 20.0000 |
| 6.5270 | 6.2054 | 20.0000 | 18 | 7.3032 | 1.7714 | 20.0000 |
| 6.8908 | 6.3908 | 20.0000 | 19 | 7.6368 | 1.8092 | 20.0000 |
| 7.2578 | 6.5692 | 20.0000 | 20 | 7.9703 | 1.8438 | 20.0000 |
| 7.6281 | 6.7405 | 20.0000 | 21 | 8.3043 | 1.8757 | 20.0000 |
| 8.0022 | 6.9038 | 20.0000 | 22 | 8.6389 | 1.9043 | 20.0000 |
| 8.3795 | 7.0600 | 20.0000 | 23 | 8.9735 | 1.9297 | 20.0000 |
| 8.7595 | 7.2076 | 20.0000 | 24 | 9.3081 | 1.9524 | 20.0000 |
| 9.1432 | 7.3465 | 20.0000 | 25 | 9.6432 | 1.9714 | 20.0000 |
| 9.5303 | 7.4768 | 20.0000 | 26 | 9.9784 | 1.9865 | 20.0000 |
| 9.9200 | 7.5973 | 20.0000 | 27 | 10.3135 | 1.9978 | 20.0000 |
| 10.3124 | 7.7086 | 20.0000 | 28 | 10.6492 | 2.0054 | 20.0000 |
| 10.7081 | 7.8097 | 20.0000 | 29 | 10.9843 | 2.0092 | 20.0000 |
| 11.1059 | 7.9005 | 20.0000 | 30 | 11.3200 | 2.0092 | 20.0000 |
| 11.5059 | 7.9805 | 20.0000 | 31 | 11.6557 | 2.0049 | 20.0000 |
| 11.9081 | 8.0492 | 20.0000 | 32 | 11.9908 | 1.9973 | 20.0000 |
| 12.3124 | 8.1065 | 20.0000 | 33 | 12.3265 | 1.9849 | 20.0000 |
| 12.7178 | 8.1514 | 20.0000 | 34 | 12.6616 | 1.9686 | 20.0000 |
| 13.1249 | 8.1838 | 20.0000 | 35 | 12.9962 | 1.9476 | 20.0000 |
| 13.5324 | 8.2032 | 20.0000 | 36 | 13.3308 | 1.9222 | 20.0000 |
| 13.9405 | 8.2097 | 20.0000 | 37 | 13.6649 | 1.8924 | 20.0000 |
| 14.3486 | 8.2032 | 20.0000 | 38 | 13.9989 | 1.8578 | 20.0000 |
| 14.7562 | 8.1827 | 20.0000 | 39 | 14.3319 | 1.8189 | 20.0000 |
| 15.1627 | 8.1486 | 20.0000 | 40 | 14.6649 | 1.7751 | 20.0000 |
| 15.5681 | 8.1011 | 20.0000 | 41 | 14.9968 | 1.7265 | 20.0000 |
| 15.9714 | 8.0389 | 20.0000 | 42 | 15.3281 | 1.6730 | 20.0000 |
| 16.3724 | 7.9627 | 20.0000 | 43 | 15.6584 | 1.6146 | 20.0000 |
| 16.7703 | 7.8724 | 20.0000 | 44 | 15.9876 | 1.5508 | 20.0000 |
| 17.1649 | 7.7681 | 20.0000 | 45 | 16.3162 | 1.4816 | 20.0000 |
| 17.5557 | 7.6497 | 20.0000 | 46 | 16.6432 | 1.4076 | 20.0000 |
| 17.9416 | 7.5184 | 20.0000 | 47 | 16.9697 | 1.3286 | 20.0000 |
| 18.3232 | 7.3730 | 20.0000 | 48 | 17.2941 | 1.2443 | 20.0000 |
| 18.6995 | 7.2151 | 20.0000 | 49 | 17.6173 | 1.1546 | 20.0000 |
| 19.0697 | 7.0443 | 20.0000 | 50 | 17.9395 | 1.0595 | 20.0000 |
| 19.4346 | 6.8605 | 20.0000 | 51 | 18.2595 | 0.9589 | 20.0000 |
| 19.7930 | 6.6654 | 20.0000 | 52 | 18.5778 | 0.8530 | 20.0000 |
| 20.1449 | 6.4589 | 20.0000 | 53 | 18.8941 | 0.7416 | 20.0000 |
| 20.4897 | 6.2411 | 20.0000 | 54 | 19.2086 | 0.6249 | 20.0000 |
| 20.8281 | 6.0124 | 20.0000 | 55 | 19.5211 | 0.5027 | 20.0000 |
| 21.1589 | 5.7741 | 20.0000 | 56 | 19.8319 | 0.3751 | 20.0000 |
| 21.4827 | 5.5254 | 20.0000 | 57 | 20.1400 | 0.2422 | 20.0000 |
| 21.7989 | 5.2676 | 20.0000 | 58 | 20.4454 | 0.1043 | 20.0000 |
| 22.1081 | 5.0005 | 20.0000 | 59 | 20.7492 | −0.0389 | 20.0000 |
| 22.4092 | 4.7254 | 20.0000 | 60 | 21.0497 | −0.1876 | 20.0000 |
| 22.7032 | 4.4427 | 20.0000 | 61 | 21.3481 | −0.3411 | 20.0000 |
| 22.9908 | 4.1530 | 20.0000 | 62 | 21.6438 | −0.5000 | 20.0000 |
| 23.2714 | 3.8568 | 20.0000 | 63 | 21.9368 | −0.6638 | 20.0000 |
| 23.5459 | 3.5546 | 20.0000 | 64 | 22.2265 | −0.8324 | 20.0000 |
| 23.8141 | 3.2470 | 20.0000 | 65 | 22.5135 | −1.0059 | 20.0000 |
| 24.0773 | 2.9351 | 20.0000 | 66 | 22.7978 | −1.1849 | 20.0000 |
| 24.3351 | 2.6184 | 20.0000 | 67 | 23.0789 | −1.3681 | 20.0000 |
| 24.5876 | 2.2984 | 20.0000 | 68 | 23.3568 | −1.5562 | 20.0000 |
| 24.8362 | 1.9741 | 20.0000 | 69 | 23.6314 | −1.7486 | 20.0000 |
| 25.0800 | 1.6470 | 20.0000 | 70 | 23.9032 | −1.9454 | 20.0000 |
| 25.3195 | 1.3168 | 20.0000 | 71 | 24.1714 | −2.1470 | 20.0000 |
| 25.5557 | 0.9838 | 20.0000 | 72 | 24.4368 | −2.3524 | 20.0000 |
| 25.7876 | 0.6481 | 20.0000 | 73 | 24.6989 | −2.5622 | 20.0000 |
| 26.0162 | 0.3103 | 20.0000 | 74 | 24.9578 | −2.7751 | 20.0000 |
| 26.2416 | −0.0303 | 20.0000 | 75 | 25.2141 | −2.9924 | 20.0000 |
| 26.4632 | −0.3730 | 20.0000 | 76 | 25.4665 | −3.2130 | 20.0000 |
| 26.6822 | −0.7173 | 20.0000 | 77 | 25.7162 | −3.4368 | 20.0000 |
| 26.8978 | −1.0638 | 20.0000 | 78 | 25.9627 | −3.6643 | 20.0000 |
| 27.1103 | −1.4124 | 20.0000 | 79 | 26.2059 | −3.8957 | 20.0000 |
| 27.3195 | −1.7627 | 20.0000 | 80 | 26.4454 | −4.1308 | 20.0000 |
| 27.5265 | −2.1146 | 20.0000 | 81 | 26.6811 | −4.3697 | 20.0000 |
| 27.7303 | −2.4681 | 20.0000 | 82 | 26.9124 | −4.6130 | 20.0000 |
| 27.9319 | −2.8227 | 20.0000 | 83 | 27.1395 | −4.8600 | 20.0000 |
| 28.1319 | −3.1784 | 20.0000 | 84 | 27.3622 | −5.1108 | 20.0000 |
| 28.3308 | −3.5346 | 20.0000 | 85 | 27.5805 | −5.3654 | 20.0000 |
| 28.5292 | −3.8914 | 20.0000 | 86 | 27.7946 | −5.6238 | 20.0000 |
| 28.7276 | −4.2481 | 20.0000 | 87 | 28.0049 | −5.8854 | 20.0000 |
| 28.9254 | −4.6054 | 20.0000 | 88 | 28.2114 | −6.1497 | 20.0000 |
| 29.1227 | −4.9627 | 20.0000 | 89 | 28.4151 | −6.4168 | 20.0000 |
| 29.3189 | −5.3200 | 20.0000 | 90 | 28.6151 | −6.6859 | 20.0000 |

TABLE I-continued

| SUCTION-SIDE | | | N | PRESSURE-SIDE | | |
|---|---|---|---|---|---|---|
| X (%) | Y (%) | Z (%) | | X (%) | Y (%) | Z (%) |
| 29.5135 | −5.6789 | 20.0000 | 91 | 28.8124 | −6.9573 | 20.0000 |
| 29.7059 | −6.0389 | 20.0000 | 92 | 29.0065 | −7.2308 | 20.0000 |
| 29.8962 | −6.4000 | 20.0000 | 93 | 29.1984 | −7.5065 | 20.0000 |
| 30.0838 | −6.7622 | 20.0000 | 94 | 29.3870 | −7.7832 | 20.0000 |
| 30.2692 | −7.1259 | 20.0000 | 95 | 29.5741 | −8.0622 | 20.0000 |
| 30.4519 | −7.4908 | 20.0000 | 96 | 29.7584 | −8.3427 | 20.0000 |
| 30.6324 | −7.8568 | 20.0000 | 97 | 29.9411 | −8.6238 | 20.0000 |
| 30.8103 | −8.2243 | 20.0000 | 98 | 30.1281 | −8.9022 | 20.0000 |
| 30.9319 | −8.6081 | 20.0000 | 99 | 30.4227 | −9.0449 | 20.0000 |
| 30.7384 | −8.9519 | 20.0000 | 100 | 30.7384 | −8.9519 | 20.0000 |
| 2.5232 | 2.4303 | 30.0000 | 1 | 2.5232 | 2.4303 | 30.0000 |
| 2.4097 | 2.8022 | 30.0000 | 2 | 2.7795 | 2.2292 | 30.0000 |
| 2.5065 | 3.1849 | 30.0000 | 3 | 3.0876 | 2.1168 | 30.0000 |
| 2.6984 | 3.5319 | 30.0000 | 4 | 3.4103 | 2.0589 | 30.0000 |
| 2.9362 | 3.8497 | 30.0000 | 5 | 3.7373 | 2.0351 | 30.0000 |
| 3.2016 | 4.1449 | 30.0000 | 6 | 4.0654 | 2.0357 | 30.0000 |
| 3.4854 | 4.4222 | 30.0000 | 7 | 4.3935 | 2.0551 | 30.0000 |
| 3.7832 | 4.6854 | 30.0000 | 8 | 4.7195 | 2.0908 | 30.0000 |
| 4.0914 | 4.9357 | 30.0000 | 9 | 5.0443 | 2.1389 | 30.0000 |
| 4.4081 | 5.1751 | 30.0000 | 10 | 5.3676 | 2.1941 | 30.0000 |
| 4.7319 | 5.4049 | 30.0000 | 11 | 5.6908 | 2.2519 | 30.0000 |
| 5.0616 | 5.6259 | 30.0000 | 12 | 6.0146 | 2.3076 | 30.0000 |
| 5.3968 | 5.8395 | 30.0000 | 13 | 6.3384 | 2.3600 | 30.0000 |
| 5.7362 | 6.0449 | 30.0000 | 14 | 6.6632 | 2.4076 | 30.0000 |
| 6.0805 | 6.2427 | 30.0000 | 15 | 6.9886 | 2.4508 | 30.0000 |
| 6.4286 | 6.4341 | 30.0000 | 16 | 7.3146 | 2.4908 | 30.0000 |
| 6.7805 | 6.6178 | 30.0000 | 17 | 7.6405 | 2.5276 | 30.0000 |
| 7.1362 | 6.7946 | 30.0000 | 18 | 7.9670 | 2.5611 | 30.0000 |
| 7.4951 | 6.9638 | 30.0000 | 19 | 8.2941 | 2.5914 | 30.0000 |
| 7.8578 | 7.1254 | 30.0000 | 20 | 8.6211 | 2.6173 | 30.0000 |
| 8.2243 | 7.2784 | 30.0000 | 21 | 8.9486 | 2.6389 | 30.0000 |
| 8.5941 | 7.4232 | 30.0000 | 22 | 9.2762 | 2.6568 | 30.0000 |
| 8.9676 | 7.5584 | 30.0000 | 23 | 9.6043 | 2.6697 | 30.0000 |
| 9.3443 | 7.6843 | 30.0000 | 24 | 9.9324 | 2.6789 | 30.0000 |
| 9.7238 | 7.8005 | 30.0000 | 25 | 10.2605 | 2.6838 | 30.0000 |
| 10.1065 | 7.9065 | 30.0000 | 26 | 10.5892 | 2.6849 | 30.0000 |
| 10.4919 | 8.0022 | 30.0000 | 27 | 10.9173 | 2.6811 | 30.0000 |
| 10.8800 | 8.0865 | 30.0000 | 28 | 11.2454 | 2.6735 | 30.0000 |
| 11.2703 | 8.1600 | 30.0000 | 29 | 11.5735 | 2.6605 | 30.0000 |
| 11.6627 | 8.2216 | 30.0000 | 30 | 11.9011 | 2.6432 | 30.0000 |
| 12.0568 | 8.2714 | 30.0000 | 31 | 12.2286 | 2.6205 | 30.0000 |
| 12.4519 | 8.3086 | 30.0000 | 32 | 12.5557 | 2.5935 | 30.0000 |
| 12.8481 | 8.3330 | 30.0000 | 33 | 12.8822 | 2.5616 | 30.0000 |
| 13.2449 | 8.3449 | 30.0000 | 34 | 13.2086 | 2.5249 | 30.0000 |
| 13.6422 | 8.3432 | 30.0000 | 35 | 13.5341 | 2.4832 | 30.0000 |
| 14.0389 | 8.3286 | 30.0000 | 36 | 13.8589 | 2.4368 | 30.0000 |
| 14.4351 | 8.3000 | 30.0000 | 37 | 14.1832 | 2.3854 | 30.0000 |
| 14.8297 | 8.2584 | 30.0000 | 38 | 14.5065 | 2.3281 | 30.0000 |
| 15.2232 | 8.2027 | 30.0000 | 39 | 14.8286 | 2.2665 | 30.0000 |
| 15.6141 | 8.1330 | 30.0000 | 40 | 15.1503 | 2.1989 | 30.0000 |
| 16.0022 | 8.0497 | 30.0000 | 41 | 15.4703 | 2.1265 | 30.0000 |
| 16.3876 | 7.9530 | 30.0000 | 42 | 15.7892 | 2.0492 | 30.0000 |
| 16.7686 | 7.8427 | 30.0000 | 43 | 16.1070 | 1.9659 | 30.0000 |
| 17.1459 | 7.7189 | 30.0000 | 44 | 16.4227 | 1.8778 | 30.0000 |
| 17.5189 | 7.5822 | 30.0000 | 45 | 16.7373 | 1.7843 | 30.0000 |
| 17.8870 | 7.4330 | 30.0000 | 46 | 17.0508 | 1.6854 | 30.0000 |
| 18.2492 | 7.2708 | 30.0000 | 47 | 17.3616 | 1.5811 | 30.0000 |
| 18.6065 | 7.0968 | 30.0000 | 48 | 17.6714 | 1.4719 | 30.0000 |
| 18.9573 | 6.9108 | 30.0000 | 49 | 17.9789 | 1.3573 | 30.0000 |
| 19.3016 | 6.7135 | 30.0000 | 50 | 18.2843 | 1.2373 | 30.0000 |
| 19.6400 | 6.5054 | 30.0000 | 51 | 18.5876 | 1.1119 | 30.0000 |
| 19.9719 | 6.2870 | 30.0000 | 52 | 18.8892 | 0.9816 | 30.0000 |
| 20.2968 | 6.0589 | 30.0000 | 53 | 19.1881 | 0.8459 | 30.0000 |
| 20.6146 | 5.8211 | 30.0000 | 54 | 19.4849 | 0.7054 | 30.0000 |
| 20.9254 | 5.5741 | 30.0000 | 55 | 19.7789 | 0.5600 | 30.0000 |
| 21.2297 | 5.3189 | 30.0000 | 56 | 20.0703 | 0.4092 | 30.0000 |
| 21.5270 | 5.0557 | 30.0000 | 57 | 20.3595 | 0.2535 | 30.0000 |
| 21.8173 | 4.7849 | 30.0000 | 58 | 20.6459 | 0.0935 | 30.0000 |
| 22.1005 | 4.5065 | 30.0000 | 59 | 20.9297 | −0.0719 | 30.0000 |
| 22.3778 | 4.2222 | 30.0000 | 60 | 21.2108 | −0.2416 | 30.0000 |
| 22.6481 | 3.9308 | 30.0000 | 61 | 21.4886 | −0.4157 | 30.0000 |
| 22.9119 | 3.6346 | 30.0000 | 62 | 21.7638 | −0.5946 | 30.0000 |
| 23.1708 | 3.3330 | 30.0000 | 63 | 22.0362 | −0.7778 | 30.0000 |
| 23.4238 | 3.0276 | 30.0000 | 64 | 22.3054 | −0.9654 | 30.0000 |
| 23.6724 | 2.7173 | 30.0000 | 65 | 22.5719 | −1.1573 | 30.0000 |
| 23.9162 | 2.4043 | 30.0000 | 66 | 22.8351 | −1.3530 | 30.0000 |
| 24.1562 | 2.0876 | 30.0000 | 67 | 23.0957 | −1.5530 | 30.0000 |
| 24.3919 | 1.7681 | 30.0000 | 68 | 23.3530 | −1.7573 | 30.0000 |
| 24.6238 | 1.4459 | 30.0000 | 69 | 23.6070 | −1.9649 | 30.0000 |
| 24.8524 | 1.1211 | 30.0000 | 70 | 23.8578 | −2.1762 | 30.0000 |
| 25.0778 | 0.7941 | 30.0000 | 71 | 24.1059 | −2.3914 | 30.0000 |
| 25.3000 | 0.4649 | 30.0000 | 72 | 24.3514 | −2.6097 | 30.0000 |
| 25.5189 | 0.1341 | 30.0000 | 73 | 24.5935 | −2.8308 | 30.0000 |
| 25.7351 | −0.1989 | 30.0000 | 74 | 24.8330 | −3.0557 | 30.0000 |
| 25.9486 | −0.5341 | 30.0000 | 75 | 25.0697 | −3.2832 | 30.0000 |
| 26.1595 | −0.8708 | 30.0000 | 76 | 25.3032 | −3.5135 | 30.0000 |
| 26.3670 | −1.2092 | 30.0000 | 77 | 25.5346 | −3.7465 | 30.0000 |
| 26.5724 | −1.5492 | 30.0000 | 78 | 25.7627 | −3.9822 | 30.0000 |
| 26.7746 | −1.8908 | 30.0000 | 79 | 25.9881 | −4.2205 | 30.0000 |
| 26.9746 | −2.2341 | 30.0000 | 80 | 26.2103 | −4.4627 | 30.0000 |
| 27.1719 | −2.5784 | 30.0000 | 81 | 26.4286 | −4.7076 | 30.0000 |
| 27.3676 | −2.9243 | 30.0000 | 82 | 26.6438 | −4.9557 | 30.0000 |
| 27.5605 | −3.2708 | 30.0000 | 83 | 26.8546 | −5.2070 | 30.0000 |
| 27.7530 | −3.6184 | 30.0000 | 84 | 27.0622 | −5.4616 | 30.0000 |
| 27.9443 | −3.9665 | 30.0000 | 85 | 27.2654 | −5.7189 | 30.0000 |
| 28.1351 | −4.3146 | 30.0000 | 86 | 27.4654 | −5.9795 | 30.0000 |
| 28.3265 | −4.6627 | 30.0000 | 87 | 27.6627 | −6.2422 | 30.0000 |
| 28.5178 | −5.0108 | 30.0000 | 88 | 27.8562 | −6.5070 | 30.0000 |
| 28.7086 | −5.3589 | 30.0000 | 89 | 28.0476 | −6.7735 | 30.0000 |
| 28.8984 | −5.7076 | 30.0000 | 90 | 28.2362 | −7.0422 | 30.0000 |
| 29.0876 | −6.0568 | 30.0000 | 91 | 28.4227 | −7.3124 | 30.0000 |
| 29.2741 | −6.4070 | 30.0000 | 92 | 28.6070 | −7.5838 | 30.0000 |
| 29.4589 | −6.7589 | 30.0000 | 93 | 28.7892 | −7.8568 | 30.0000 |
| 29.6416 | −7.1114 | 30.0000 | 94 | 28.9703 | −8.1308 | 30.0000 |
| 29.8222 | −7.4649 | 30.0000 | 95 | 29.1492 | −8.4059 | 30.0000 |
| 30.0005 | −7.8200 | 30.0000 | 96 | 29.3270 | −8.6822 | 30.0000 |
| 30.1768 | −8.1757 | 30.0000 | 97 | 29.5032 | −8.9589 | 30.0000 |
| 30.3508 | −8.5330 | 30.0000 | 98 | 29.6903 | −9.2276 | 30.0000 |
| 30.4714 | −8.9059 | 30.0000 | 99 | 29.9865 | −9.3497 | 30.0000 |
| 30.2919 | −9.2459 | 30.0000 | 100 | 30.2919 | −9.2459 | 30.0000 |
| 3.1249 | 3.3519 | 40.0000 | 1 | 3.1249 | 3.3519 | 40.0000 |
| 3.0584 | 3.7249 | 40.0000 | 2 | 3.3503 | 3.1270 | 40.0000 |
| 3.1751 | 4.0914 | 40.0000 | 3 | 3.6427 | 2.9957 | 40.0000 |
| 3.3746 | 4.4211 | 40.0000 | 4 | 3.9557 | 2.9227 | 40.0000 |
| 3.6151 | 4.7232 | 40.0000 | 5 | 4.2751 | 2.8870 | 40.0000 |
| 3.8811 | 5.0027 | 40.0000 | 6 | 4.5962 | 2.8773 | 40.0000 |
| 4.1643 | 5.2649 | 40.0000 | 7 | 4.9178 | 2.8876 | 40.0000 |
| 4.4605 | 5.5124 | 40.0000 | 8 | 5.2378 | 2.9151 | 40.0000 |
| 4.7665 | 5.7476 | 40.0000 | 9 | 5.5568 | 2.9557 | 40.0000 |
| 5.0811 | 5.9719 | 40.0000 | 10 | 5.8746 | 3.0054 | 40.0000 |
| 5.4022 | 6.1859 | 40.0000 | 11 | 6.1914 | 3.0584 | 40.0000 |
| 5.7292 | 6.3914 | 40.0000 | 12 | 6.5086 | 3.1103 | 40.0000 |
| 6.0611 | 6.5881 | 40.0000 | 13 | 6.8270 | 3.1578 | 40.0000 |
| 6.3978 | 6.7768 | 40.0000 | 14 | 7.1454 | 3.2005 | 40.0000 |
| 6.7389 | 6.9578 | 40.0000 | 15 | 7.4649 | 3.2378 | 40.0000 |
| 7.0838 | 7.1314 | 40.0000 | 16 | 7.7849 | 3.2708 | 40.0000 |
| 7.4324 | 7.2968 | 40.0000 | 17 | 8.1049 | 3.3000 | 40.0000 |
| 7.7854 | 7.4535 | 40.0000 | 18 | 8.4254 | 3.3254 | 40.0000 |
| 8.1416 | 7.6016 | 40.0000 | 19 | 8.7465 | 3.3465 | 40.0000 |
| 8.5022 | 7.7405 | 40.0000 | 20 | 9.0676 | 3.3627 | 40.0000 |
| 8.8659 | 7.8697 | 40.0000 | 21 | 9.3886 | 3.3741 | 40.0000 |
| 9.2330 | 7.9892 | 40.0000 | 22 | 9.7103 | 3.3805 | 40.0000 |
| 9.6032 | 8.0978 | 40.0000 | 23 | 10.0319 | 3.3816 | 40.0000 |
| 9.9768 | 8.1951 | 40.0000 | 24 | 10.3530 | 3.3773 | 40.0000 |
| 10.3530 | 8.2816 | 40.0000 | 25 | 10.6746 | 3.3692 | 40.0000 |
| 10.7319 | 8.3562 | 40.0000 | 26 | 10.9957 | 3.3557 | 40.0000 |
| 11.1130 | 8.4189 | 40.0000 | 27 | 11.3168 | 3.3368 | 40.0000 |
| 11.4957 | 8.4692 | 40.0000 | 28 | 11.6373 | 3.3124 | 40.0000 |
| 11.8795 | 8.5070 | 40.0000 | 29 | 11.9573 | 3.2827 | 40.0000 |
| 12.2649 | 8.5314 | 40.0000 | 30 | 12.2773 | 3.2476 | 40.0000 |
| 12.6508 | 8.5432 | 40.0000 | 31 | 12.5962 | 3.2070 | 40.0000 |
| 13.0368 | 8.5411 | 40.0000 | 32 | 12.9141 | 3.1611 | 40.0000 |
| 13.4227 | 8.5259 | 40.0000 | 33 | 13.2319 | 3.1103 | 40.0000 |
| 13.8076 | 8.4968 | 40.0000 | 34 | 13.5481 | 3.0535 | 40.0000 |
| 14.1914 | 8.4546 | 40.0000 | 35 | 13.8638 | 2.9908 | 40.0000 |
| 14.5730 | 8.3984 | 40.0000 | 36 | 14.1778 | 2.9232 | 40.0000 |
| 14.9530 | 8.3286 | 40.0000 | 37 | 14.4908 | 2.8497 | 40.0000 |
| 15.3297 | 8.2459 | 40.0000 | 38 | 14.8027 | 2.7708 | 40.0000 |
| 15.7038 | 8.1497 | 40.0000 | 39 | 15.1130 | 2.6865 | 40.0000 |
| 16.0741 | 8.0405 | 40.0000 | 40 | 15.4216 | 2.5968 | 40.0000 |
| 16.4400 | 7.9184 | 40.0000 | 41 | 15.7286 | 2.5016 | 40.0000 |
| 16.8022 | 7.7838 | 40.0000 | 42 | 16.0341 | 2.4011 | 40.0000 |

TABLE I-continued

| SUCTION-SIDE | | | PRESSURE-SIDE | | | N |
|---|---|---|---|---|---|---|
| X (%) | Y (%) | Z (%) | X (%) | Y (%) | Z (%) | |
| 17.1589 | 7.6373 | 40.0000 | 16.3378 | 2.2951 | 40.0000 | 43 |
| 17.5114 | 7.4789 | 40.0000 | 16.6395 | 2.1838 | 40.0000 | 44 |
| 17.8578 | 7.3086 | 40.0000 | 16.9389 | 2.0676 | 40.0000 | 45 |
| 18.1989 | 7.1276 | 40.0000 | 17.2368 | 1.9459 | 40.0000 | 46 |
| 18.5335 | 6.9362 | 40.0000 | 17.5319 | 1.8189 | 40.0000 | 47 |
| 18.8627 | 6.7341 | 40.0000 | 17.8254 | 1.6870 | 40.0000 | 48 |
| 19.1854 | 6.5222 | 40.0000 | 18.1162 | 1.5503 | 40.0000 | 49 |
| 19.5016 | 6.3005 | 40.0000 | 18.4049 | 1.4086 | 40.0000 | 50 |
| 19.8114 | 6.0703 | 40.0000 | 18.6908 | 1.2616 | 40.0000 | 51 |
| 20.1146 | 5.8314 | 40.0000 | 18.9746 | 1.1103 | 40.0000 | 52 |
| 20.4114 | 5.5849 | 40.0000 | 19.2557 | 0.9546 | 40.0000 | 53 |
| 20.7022 | 5.3308 | 40.0000 | 19.5341 | 0.7941 | 40.0000 | 54 |
| 20.9865 | 5.0697 | 40.0000 | 19.8103 | 0.6286 | 40.0000 | 55 |
| 21.2643 | 4.8016 | 40.0000 | 20.0832 | 0.4595 | 40.0000 | 56 |
| 21.5362 | 4.5276 | 40.0000 | 20.3541 | 0.2859 | 40.0000 | 57 |
| 21.8022 | 4.2476 | 40.0000 | 20.6216 | 0.1081 | 40.0000 | 58 |
| 22.0622 | 3.9622 | 40.0000 | 20.8870 | −0.0741 | 40.0000 | 59 |
| 22.3168 | 3.6719 | 40.0000 | 21.1492 | −0.2600 | 40.0000 | 60 |
| 22.5665 | 3.3773 | 40.0000 | 21.4086 | −0.4497 | 40.0000 | 61 |
| 22.8108 | 3.0789 | 40.0000 | 21.6654 | −0.6432 | 40.0000 | 62 |
| 23.0508 | 2.7762 | 40.0000 | 21.9195 | −0.8411 | 40.0000 | 63 |
| 23.2859 | 2.4703 | 40.0000 | 22.1703 | −1.0416 | 40.0000 | 64 |
| 23.5173 | 2.1611 | 40.0000 | 22.4184 | −1.2459 | 40.0000 | 65 |
| 23.7449 | 1.8492 | 40.0000 | 22.6638 | −1.4541 | 40.0000 | 66 |
| 23.9692 | 1.5351 | 40.0000 | 22.9065 | −1.6649 | 40.0000 | 67 |
| 24.1903 | 1.2189 | 40.0000 | 23.1459 | −1.8795 | 40.0000 | 68 |
| 24.4086 | 0.9000 | 40.0000 | 23.3827 | −2.0968 | 40.0000 | 69 |
| 24.6243 | 0.5800 | 40.0000 | 23.6168 | −2.3173 | 40.0000 | 70 |
| 24.8373 | 0.2578 | 40.0000 | 23.8481 | −2.5405 | 40.0000 | 71 |
| 25.0476 | −0.0659 | 40.0000 | 24.0768 | −2.7665 | 40.0000 | 72 |
| 25.2551 | −0.3908 | 40.0000 | 24.3032 | −2.9951 | 40.0000 | 73 |
| 25.4605 | −0.7178 | 40.0000 | 24.5270 | −3.2259 | 40.0000 | 74 |
| 25.6632 | −1.0465 | 40.0000 | 24.7481 | −3.4589 | 40.0000 | 75 |
| 25.8627 | −1.3773 | 40.0000 | 24.9676 | −3.6941 | 40.0000 | 76 |
| 26.0600 | −1.7092 | 40.0000 | 25.1843 | −3.9314 | 40.0000 | 77 |
| 26.2546 | −2.0422 | 40.0000 | 25.3989 | −4.1714 | 40.0000 | 78 |
| 26.4470 | −2.3773 | 40.0000 | 25.6108 | −4.4130 | 40.0000 | 79 |
| 26.6373 | −2.7130 | 40.0000 | 25.8195 | −4.6573 | 40.0000 | 80 |
| 26.8259 | −3.0497 | 40.0000 | 26.0254 | −4.9043 | 40.0000 | 81 |
| 27.0130 | −3.3876 | 40.0000 | 26.2281 | −5.1541 | 40.0000 | 82 |
| 27.1989 | −3.7254 | 40.0000 | 26.4276 | −5.4059 | 40.0000 | 83 |
| 27.3843 | −4.0643 | 40.0000 | 26.6238 | −5.6611 | 40.0000 | 84 |
| 27.5692 | −4.4032 | 40.0000 | 26.8168 | −5.9178 | 40.0000 | 85 |
| 27.7530 | −4.7427 | 40.0000 | 27.0065 | −6.1773 | 40.0000 | 86 |
| 27.9368 | −5.0822 | 40.0000 | 27.1941 | −6.4389 | 40.0000 | 87 |
| 28.1200 | −5.4222 | 40.0000 | 27.3784 | −6.7022 | 40.0000 | 88 |
| 28.3027 | −5.7622 | 40.0000 | 27.5605 | −6.9670 | 40.0000 | 89 |
| 28.4843 | −6.1027 | 40.0000 | 27.7411 | −7.2335 | 40.0000 | 90 |
| 28.6654 | −6.4438 | 40.0000 | 27.9195 | −7.5005 | 40.0000 | 91 |
| 28.8454 | −6.7854 | 40.0000 | 28.0962 | −7.7692 | 40.0000 | 92 |
| 29.0243 | −7.1276 | 40.0000 | 28.2714 | −8.0389 | 40.0000 | 93 |
| 29.2011 | −7.4703 | 40.0000 | 28.4459 | −8.3086 | 40.0000 | 94 |
| 29.3762 | −7.8146 | 40.0000 | 28.6189 | −8.5800 | 40.0000 | 95 |
| 29.5486 | −8.1600 | 40.0000 | 28.7914 | −8.8514 | 40.0000 | 96 |
| 29.7189 | −8.5065 | 40.0000 | 28.9622 | −9.1238 | 40.0000 | 97 |
| 29.8870 | −8.8541 | 40.0000 | 29.1341 | −9.3957 | 40.0000 | 98 |
| 29.9476 | −9.2259 | 40.0000 | 29.3989 | −9.5643 | 40.0000 | 99 |
| 29.7108 | −9.5168 | 40.0000 | 29.7108 | −9.5168 | 40.0000 | 100 |
| 3.6989 | 4.2449 | 50.0000 | 3.6989 | 4.2449 | 50.0000 | 1 |
| 3.6459 | 4.6092 | 50.0000 | 3.9097 | 4.0135 | 50.0000 | 2 |
| 3.7654 | 4.9627 | 50.0000 | 4.1903 | 3.8714 | 50.0000 | 3 |
| 3.9659 | 5.2789 | 50.0000 | 4.4946 | 3.7886 | 50.0000 | 4 |
| 4.2059 | 5.5665 | 50.0000 | 4.8070 | 3.7432 | 50.0000 | 5 |
| 4.4703 | 5.8319 | 50.0000 | 5.1216 | 3.7227 | 50.0000 | 6 |
| 4.7524 | 6.0789 | 50.0000 | 5.4373 | 3.7232 | 50.0000 | 7 |
| 5.0465 | 6.3103 | 50.0000 | 5.7524 | 3.7427 | 50.0000 | 8 |
| 5.3508 | 6.5292 | 50.0000 | 6.0659 | 3.7762 | 50.0000 | 9 |
| 5.6632 | 6.7362 | 50.0000 | 6.3789 | 3.8184 | 50.0000 | 10 |
| 5.9822 | 6.9335 | 50.0000 | 6.6914 | 3.8632 | 50.0000 | 11 |
| 6.3065 | 7.1211 | 50.0000 | 7.0043 | 3.9059 | 50.0000 | 12 |
| 6.6357 | 7.2995 | 50.0000 | 7.3173 | 3.9454 | 50.0000 | 13 |
| 6.9697 | 7.4697 | 50.0000 | 7.6314 | 3.9789 | 50.0000 | 14 |
| 7.3076 | 7.6314 | 50.0000 | 7.9454 | 4.0076 | 50.0000 | 15 |
| 7.6497 | 7.7843 | 50.0000 | 8.2600 | 4.0308 | 50.0000 | 16 |
| 7.9957 | 7.9281 | 50.0000 | 8.5751 | 4.0492 | 50.0000 | 17 |
| 8.3459 | 8.0622 | 50.0000 | 8.8908 | 4.0622 | 50.0000 | 18 |
| 8.6995 | 8.1859 | 50.0000 | 9.2065 | 4.0703 | 50.0000 | 19 |
| 9.0562 | 8.2995 | 50.0000 | 9.5216 | 4.0735 | 50.0000 | 20 |
| 9.4168 | 8.4022 | 50.0000 | 9.8373 | 4.0708 | 50.0000 | 21 |
| 9.7805 | 8.4935 | 50.0000 | 10.1530 | 4.0627 | 50.0000 | 22 |
| 10.1465 | 8.5724 | 50.0000 | 10.4681 | 4.0492 | 50.0000 | 23 |
| 10.5151 | 8.6395 | 50.0000 | 10.7832 | 4.0297 | 50.0000 | 24 |
| 10.8859 | 8.6941 | 50.0000 | 11.0978 | 4.0043 | 50.0000 | 25 |
| 11.2584 | 8.7357 | 50.0000 | 11.4119 | 3.9735 | 50.0000 | 26 |
| 11.6319 | 8.7638 | 50.0000 | 11.7254 | 3.9362 | 50.0000 | 27 |
| 12.0065 | 8.7789 | 50.0000 | 12.0384 | 3.8935 | 50.0000 | 28 |
| 12.3811 | 8.7805 | 50.0000 | 12.3503 | 3.8449 | 50.0000 | 29 |
| 12.7557 | 8.7681 | 50.0000 | 12.6611 | 3.7897 | 50.0000 | 30 |
| 13.1297 | 8.7422 | 50.0000 | 12.9708 | 3.7292 | 50.0000 | 31 |
| 13.5022 | 8.7022 | 50.0000 | 13.2795 | 3.6627 | 50.0000 | 32 |
| 13.8730 | 8.6486 | 50.0000 | 13.5865 | 3.5897 | 50.0000 | 33 |
| 14.2416 | 8.5816 | 50.0000 | 13.8919 | 3.5114 | 50.0000 | 34 |
| 14.6076 | 8.5016 | 50.0000 | 14.1962 | 3.4270 | 50.0000 | 35 |
| 14.9703 | 8.4081 | 50.0000 | 14.4989 | 3.3368 | 50.0000 | 36 |
| 15.3297 | 8.3016 | 50.0000 | 14.7995 | 3.2405 | 50.0000 | 37 |
| 15.6854 | 8.1827 | 50.0000 | 15.0984 | 3.1395 | 50.0000 | 38 |
| 16.0362 | 8.0519 | 50.0000 | 15.3951 | 3.0319 | 50.0000 | 39 |
| 16.3827 | 7.9092 | 50.0000 | 15.6903 | 2.9195 | 50.0000 | 40 |
| 16.7243 | 7.7551 | 50.0000 | 15.9827 | 2.8011 | 50.0000 | 41 |
| 17.0611 | 7.5903 | 50.0000 | 16.2730 | 2.6778 | 50.0000 | 42 |
| 17.3919 | 7.4146 | 50.0000 | 16.5616 | 2.5492 | 50.0000 | 43 |
| 17.7173 | 7.2292 | 50.0000 | 16.8470 | 2.4151 | 50.0000 | 44 |
| 18.0373 | 7.0341 | 50.0000 | 17.1308 | 2.2762 | 50.0000 | 45 |
| 18.3514 | 6.8292 | 50.0000 | 17.4119 | 2.1324 | 50.0000 | 46 |
| 18.6589 | 6.6157 | 50.0000 | 17.6903 | 1.9838 | 50.0000 | 47 |
| 18.9611 | 6.3941 | 50.0000 | 17.9659 | 1.8308 | 50.0000 | 48 |
| 19.2568 | 6.1638 | 50.0000 | 18.2395 | 1.6730 | 50.0000 | 49 |
| 19.5470 | 5.9265 | 50.0000 | 18.5103 | 1.5108 | 50.0000 | 50 |
| 19.8308 | 5.6816 | 50.0000 | 18.7784 | 1.3443 | 50.0000 | 51 |
| 20.1086 | 5.4303 | 50.0000 | 19.0443 | 1.1741 | 50.0000 | 52 |
| 20.3805 | 5.1730 | 50.0000 | 19.3070 | 0.9995 | 50.0000 | 53 |
| 20.6470 | 4.9092 | 50.0000 | 19.5670 | 0.8205 | 50.0000 | 54 |
| 20.9081 | 4.6405 | 50.0000 | 19.8243 | 0.6378 | 50.0000 | 55 |
| 21.1638 | 4.3665 | 50.0000 | 20.0795 | 0.4514 | 50.0000 | 56 |
| 21.4146 | 4.0881 | 50.0000 | 20.3314 | 0.2611 | 50.0000 | 57 |
| 21.6605 | 3.8049 | 50.0000 | 20.5805 | 0.0676 | 50.0000 | 58 |
| 21.9016 | 3.5184 | 50.0000 | 20.8276 | −0.1292 | 50.0000 | 59 |
| 22.1378 | 3.2276 | 50.0000 | 21.0719 | −0.3292 | 50.0000 | 60 |
| 22.3703 | 2.9335 | 50.0000 | 21.3135 | −0.5319 | 50.0000 | 61 |
| 22.5989 | 2.6368 | 50.0000 | 21.5524 | −0.7378 | 50.0000 | 62 |
| 22.8238 | 2.3368 | 50.0000 | 21.7892 | −0.9470 | 50.0000 | 63 |
| 23.0449 | 2.0341 | 50.0000 | 22.0227 | −1.1589 | 50.0000 | 64 |
| 23.2627 | 1.7292 | 50.0000 | 22.2541 | −1.3741 | 50.0000 | 65 |
| 23.4773 | 1.4222 | 50.0000 | 22.4822 | −1.5919 | 50.0000 | 66 |
| 23.6892 | 1.1130 | 50.0000 | 22.7081 | −1.8124 | 50.0000 | 67 |
| 23.8978 | 0.8016 | 50.0000 | 22.9308 | −2.0362 | 50.0000 | 68 |
| 24.1043 | 0.4892 | 50.0000 | 23.1514 | −2.2616 | 50.0000 | 69 |
| 24.3086 | 0.1746 | 50.0000 | 23.3697 | −2.4897 | 50.0000 | 70 |
| 24.5103 | −0.1411 | 50.0000 | 23.5865 | −2.7195 | 50.0000 | 71 |
| 24.7103 | −0.4578 | 50.0000 | 23.8005 | −2.9514 | 50.0000 | 72 |
| 24.9076 | −0.7762 | 50.0000 | 24.0130 | −3.1849 | 50.0000 | 73 |
| 25.1032 | −1.0962 | 50.0000 | 24.2232 | −3.4200 | 50.0000 | 74 |
| 25.2962 | −1.4173 | 50.0000 | 24.4319 | −3.6573 | 50.0000 | 75 |
| 25.4870 | −1.7395 | 50.0000 | 24.6384 | −3.8957 | 50.0000 | 76 |
| 25.6757 | −2.0638 | 50.0000 | 24.8422 | −4.1368 | 50.0000 | 77 |
| 25.8616 | −2.3886 | 50.0000 | 25.0443 | −4.3789 | 50.0000 | 78 |
| 26.0454 | −2.7157 | 50.0000 | 25.2438 | −4.6238 | 50.0000 | 79 |
| 26.2270 | −3.0432 | 50.0000 | 25.4411 | −4.8703 | 50.0000 | 80 |
| 26.4070 | −3.3719 | 50.0000 | 25.6351 | −5.1189 | 50.0000 | 81 |
| 26.5859 | −3.7011 | 50.0000 | 25.8270 | −5.3697 | 50.0000 | 82 |
| 26.7638 | −4.0314 | 50.0000 | 26.0157 | −5.6227 | 50.0000 | 83 |
| 26.9411 | −4.3611 | 50.0000 | 26.2016 | −5.8778 | 50.0000 | 84 |
| 27.1184 | −4.6914 | 50.0000 | 26.3854 | −6.1346 | 50.0000 | 85 |
| 27.2951 | −5.0216 | 50.0000 | 26.5665 | −6.3930 | 50.0000 | 86 |
| 27.4724 | −5.3519 | 50.0000 | 26.7449 | −6.6535 | 50.0000 | 87 |
| 27.6497 | −5.6822 | 50.0000 | 26.9216 | −6.9146 | 50.0000 | 88 |
| 27.8265 | −6.0124 | 50.0000 | 27.0962 | −7.1778 | 50.0000 | 89 |
| 28.0022 | −6.3432 | 50.0000 | 27.2692 | −7.4416 | 50.0000 | 90 |
| 28.1773 | −6.6746 | 50.0000 | 27.4411 | −7.7065 | 50.0000 | 91 |
| 28.3514 | −7.0070 | 50.0000 | 27.6114 | −7.9724 | 50.0000 | 92 |
| 28.5232 | −7.3400 | 50.0000 | 27.7805 | −8.2389 | 50.0000 | 93 |
| 28.6930 | −7.6735 | 50.0000 | 27.9486 | −8.5059 | 50.0000 | 94 |

TABLE I-continued

| SUCTION-SIDE | | | | PRESSURE-SIDE | | | | SUCTION-SIDE | | | | PRESSURE-SIDE | | |
|---|---|---|---|---|---|---|---|---|---|---|---|---|---|---|
| X (%) | Y (%) | Z (%) | N | X (%) | Y (%) | Z (%) | | X (%) | Y (%) | Z (%) | N | X (%) | Y (%) | Z (%) |
| 28.8616 | −8.0086 | 50.0000 | 95 | 28.1162 | −8.7735 | 50.0000 | | 24.1297 | −0.4665 | 60.0000 | 71 | 23.2600 | −2.8951 | 60.0000 |
| 29.0276 | −8.3443 | 50.0000 | 96 | 28.2832 | −9.0411 | 50.0000 | | 24.3205 | −0.7757 | 60.0000 | 72 | 23.4616 | −3.1303 | 60.0000 |
| 29.1914 | −8.6816 | 50.0000 | 97 | 28.4497 | −9.3097 | 50.0000 | | 24.5086 | −1.0865 | 60.0000 | 73 | 23.6622 | −3.3659 | 60.0000 |
| 29.3535 | −9.0195 | 50.0000 | 98 | 28.6205 | −9.5746 | 50.0000 | | 24.6951 | −1.3989 | 60.0000 | 74 | 23.8605 | −3.6038 | 60.0000 |
| 29.4135 | −9.3805 | 50.0000 | 99 | 28.8881 | −9.7292 | 50.0000 | | 24.8795 | −1.7119 | 60.0000 | 75 | 24.0573 | −3.8427 | 60.0000 |
| 29.1919 | −9.6697 | 50.0000 | 100 | 29.1919 | −9.6697 | 50.0000 | | 25.0616 | −2.0265 | 60.0000 | 76 | 24.2524 | −4.0827 | 60.0000 |
| 4.2400 | 5.0946 | 60.0000 | 1 | 4.2400 | 5.0946 | 60.0000 | | 25.2416 | −2.3416 | 60.0000 | 77 | 24.4454 | −4.3249 | 60.0000 |
| 4.1832 | 5.4476 | 60.0000 | 2 | 4.4438 | 4.8649 | 60.0000 | | 25.4200 | −2.6584 | 60.0000 | 78 | 24.6368 | −4.5681 | 60.0000 |
| 4.2995 | 5.7903 | 60.0000 | 3 | 4.7151 | 4.7184 | 60.0000 | | 25.5968 | −2.9762 | 60.0000 | 79 | 24.8259 | −4.8135 | 60.0000 |
| 4.4978 | 6.0941 | 60.0000 | 4 | 5.0108 | 4.6265 | 60.0000 | | 25.7714 | −3.2946 | 60.0000 | 80 | 25.0130 | −5.0600 | 60.0000 |
| 4.7378 | 6.3670 | 60.0000 | 5 | 5.3146 | 4.5686 | 60.0000 | | 25.9449 | −3.6141 | 60.0000 | 81 | 25.1978 | −5.3081 | 60.0000 |
| 5.0016 | 6.6162 | 60.0000 | 6 | 5.6227 | 4.5373 | 60.0000 | | 26.1168 | −3.9346 | 60.0000 | 82 | 25.3805 | −5.5584 | 60.0000 |
| 5.2827 | 6.8470 | 60.0000 | 7 | 5.9319 | 4.5297 | 60.0000 | | 26.2876 | −4.2551 | 60.0000 | 83 | 25.5611 | −5.8097 | 60.0000 |
| 5.5762 | 7.0611 | 60.0000 | 8 | 6.2411 | 4.5411 | 60.0000 | | 26.4573 | −4.5762 | 60.0000 | 84 | 25.7395 | −6.0632 | 60.0000 |
| 5.8795 | 7.2616 | 60.0000 | 9 | 6.5503 | 4.5643 | 60.0000 | | 26.6270 | −4.8978 | 60.0000 | 85 | 25.9151 | −6.3178 | 60.0000 |
| 6.1903 | 7.4497 | 60.0000 | 10 | 6.8584 | 4.5935 | 60.0000 | | 26.7968 | −5.2189 | 60.0000 | 86 | 26.0892 | −6.5735 | 60.0000 |
| 6.5070 | 7.6276 | 60.0000 | 11 | 7.1659 | 4.6249 | 60.0000 | | 26.9659 | −5.5405 | 60.0000 | 87 | 26.2611 | −6.8314 | 60.0000 |
| 6.8292 | 7.7957 | 60.0000 | 12 | 7.4741 | 4.6551 | 60.0000 | | 27.1351 | −5.8622 | 60.0000 | 88 | 26.4314 | −7.0897 | 60.0000 |
| 7.1562 | 7.9541 | 60.0000 | 13 | 7.7827 | 4.6811 | 60.0000 | | 27.3043 | −6.1838 | 60.0000 | 89 | 26.5995 | −7.3497 | 60.0000 |
| 7.4881 | 8.1027 | 60.0000 | 14 | 8.0914 | 4.7027 | 60.0000 | | 27.4730 | −6.5059 | 60.0000 | 90 | 26.7665 | −7.6103 | 60.0000 |
| 7.8232 | 8.2422 | 60.0000 | 15 | 8.4005 | 4.7184 | 60.0000 | | 27.6411 | −6.8281 | 60.0000 | 91 | 26.9319 | −7.8719 | 60.0000 |
| 8.1627 | 8.3724 | 60.0000 | 16 | 8.7103 | 4.7281 | 60.0000 | | 27.8081 | −7.1508 | 60.0000 | 92 | 27.0962 | −8.1341 | 60.0000 |
| 8.5059 | 8.4919 | 60.0000 | 17 | 9.0195 | 4.7319 | 60.0000 | | 27.9735 | −7.4741 | 60.0000 | 93 | 27.2600 | −8.3968 | 60.0000 |
| 8.8524 | 8.6005 | 60.0000 | 18 | 9.3292 | 4.7297 | 60.0000 | | 28.1378 | −7.7984 | 60.0000 | 94 | 27.4232 | −8.6600 | 60.0000 |
| 9.2027 | 8.6984 | 60.0000 | 19 | 9.6389 | 4.7222 | 60.0000 | | 28.3000 | −8.1238 | 60.0000 | 95 | 27.5859 | −8.9238 | 60.0000 |
| 9.5557 | 8.7838 | 60.0000 | 20 | 9.9481 | 4.7092 | 60.0000 | | 28.4605 | −8.4497 | 60.0000 | 96 | 27.7481 | −9.1870 | 60.0000 |
| 9.9119 | 8.8578 | 60.0000 | 21 | 10.2573 | 4.6908 | 60.0000 | | 28.6184 | −8.7773 | 60.0000 | 97 | 27.9103 | −9.4508 | 60.0000 |
| 10.2697 | 8.9189 | 60.0000 | 22 | 10.5659 | 4.6659 | 60.0000 | | 28.7735 | −9.1059 | 60.0000 | 98 | 28.0832 | −9.7065 | 60.0000 |
| 10.6303 | 8.9670 | 60.0000 | 23 | 10.8735 | 4.6357 | 60.0000 | | 28.8454 | −9.4551 | 60.0000 | 99 | 28.3584 | −9.8330 | 60.0000 |
| 10.9919 | 9.0022 | 60.0000 | 24 | 11.1811 | 4.5995 | 60.0000 | | 28.6508 | −9.7508 | 60.0000 | 100 | 28.6508 | −9.7508 | 60.0000 |
| 11.3546 | 9.0232 | 60.0000 | 25 | 11.4876 | 4.5562 | 60.0000 | | 4.7108 | 6.0411 | 70.0000 | 1 | 4.7108 | 6.0411 | 70.0000 |
| 11.7178 | 9.0308 | 60.0000 | 26 | 11.7935 | 4.5070 | 60.0000 | | 4.7276 | 6.3870 | 70.0000 | 2 | 4.8584 | 5.7789 | 70.0000 |
| 12.0811 | 9.0249 | 60.0000 | 27 | 12.0978 | 4.4508 | 60.0000 | | 4.8822 | 6.7005 | 70.0000 | 3 | 5.1005 | 5.5962 | 70.0000 |
| 12.4438 | 9.0049 | 60.0000 | 28 | 12.4011 | 4.3886 | 60.0000 | | 5.1011 | 6.9746 | 70.0000 | 4 | 5.3768 | 5.4708 | 70.0000 |
| 12.8059 | 8.9708 | 60.0000 | 29 | 12.7027 | 4.3195 | 60.0000 | | 5.3535 | 7.2184 | 70.0000 | 5 | 5.6692 | 5.3859 | 70.0000 |
| 13.1659 | 8.9227 | 60.0000 | 30 | 13.0032 | 4.2443 | 60.0000 | | 5.6270 | 7.4384 | 70.0000 | 6 | 5.9686 | 5.3330 | 70.0000 |
| 13.5243 | 8.8605 | 60.0000 | 31 | 13.3016 | 4.1627 | 60.0000 | | 5.9146 | 7.6395 | 70.0000 | 7 | 6.2714 | 5.3038 | 70.0000 |
| 13.8795 | 8.7849 | 60.0000 | 32 | 13.5989 | 4.0751 | 60.0000 | | 6.2124 | 7.8249 | 70.0000 | 8 | 6.5751 | 5.2930 | 70.0000 |
| 14.2319 | 8.6962 | 60.0000 | 33 | 13.8935 | 3.9816 | 60.0000 | | 6.5189 | 7.9962 | 70.0000 | 9 | 6.8795 | 5.2941 | 70.0000 |
| 14.5805 | 8.5941 | 60.0000 | 34 | 14.1870 | 3.8822 | 60.0000 | | 6.8314 | 8.1557 | 70.0000 | 10 | 7.1832 | 5.3032 | 70.0000 |
| 14.9254 | 8.4795 | 60.0000 | 35 | 14.4778 | 3.7762 | 60.0000 | | 7.1497 | 8.3043 | 70.0000 | 11 | 7.4876 | 5.3157 | 70.0000 |
| 15.2659 | 8.3530 | 60.0000 | 36 | 14.7665 | 3.6643 | 60.0000 | | 7.4724 | 8.4422 | 70.0000 | 12 | 7.7914 | 5.3281 | 70.0000 |
| 15.6022 | 8.2146 | 60.0000 | 37 | 15.0530 | 3.5470 | 60.0000 | | 7.7989 | 8.5697 | 70.0000 | 13 | 8.0951 | 5.3373 | 70.0000 |
| 15.9330 | 8.0643 | 60.0000 | 38 | 15.3368 | 3.4232 | 60.0000 | | 8.1297 | 8.6876 | 70.0000 | 14 | 8.3995 | 5.3416 | 70.0000 |
| 16.2589 | 7.9038 | 60.0000 | 39 | 15.6184 | 3.2946 | 60.0000 | | 8.4643 | 8.7941 | 70.0000 | 15 | 8.7038 | 5.3400 | 70.0000 |
| 16.5800 | 7.7330 | 60.0000 | 40 | 15.8968 | 3.1600 | 60.0000 | | 8.8016 | 8.8903 | 70.0000 | 16 | 9.0076 | 5.3324 | 70.0000 |
| 16.8951 | 7.5524 | 60.0000 | 41 | 16.1735 | 3.0200 | 60.0000 | | 9.1422 | 8.9751 | 70.0000 | 17 | 9.3119 | 5.3178 | 70.0000 |
| 17.2049 | 7.3622 | 60.0000 | 42 | 16.4470 | 2.8757 | 60.0000 | | 9.4854 | 9.0481 | 70.0000 | 18 | 9.6151 | 5.2978 | 70.0000 |
| 17.5086 | 7.1632 | 60.0000 | 43 | 16.7178 | 2.7254 | 60.0000 | | 9.8314 | 9.1092 | 70.0000 | 19 | 9.9184 | 5.2719 | 70.0000 |
| 17.8076 | 6.9562 | 60.0000 | 44 | 16.9859 | 2.5714 | 60.0000 | | 10.1789 | 9.1573 | 70.0000 | 20 | 10.2211 | 5.2405 | 70.0000 |
| 18.1000 | 6.7411 | 60.0000 | 45 | 17.2519 | 2.4119 | 60.0000 | | 10.5281 | 9.1924 | 70.0000 | 21 | 10.5227 | 5.2043 | 70.0000 |
| 18.3876 | 6.5184 | 60.0000 | 46 | 17.5146 | 2.2486 | 60.0000 | | 10.8784 | 9.2141 | 70.0000 | 22 | 10.8243 | 5.1627 | 70.0000 |
| 18.6692 | 6.2892 | 60.0000 | 47 | 17.7746 | 2.0811 | 60.0000 | | 11.2292 | 9.2227 | 70.0000 | 23 | 11.1249 | 5.1151 | 70.0000 |
| 18.9454 | 6.0530 | 60.0000 | 48 | 18.0319 | 1.9092 | 60.0000 | | 11.5800 | 9.2173 | 70.0000 | 24 | 11.4243 | 5.0616 | 70.0000 |
| 19.2162 | 5.8103 | 60.0000 | 49 | 18.2870 | 1.7330 | 60.0000 | | 11.9303 | 9.1989 | 70.0000 | 25 | 11.7222 | 5.0016 | 70.0000 |
| 19.4816 | 5.5616 | 60.0000 | 50 | 18.5389 | 1.5530 | 60.0000 | | 12.2800 | 9.1665 | 70.0000 | 26 | 12.0195 | 4.9357 | 70.0000 |
| 19.7411 | 5.3076 | 60.0000 | 51 | 18.7876 | 1.3692 | 60.0000 | | 12.6281 | 9.1205 | 70.0000 | 27 | 12.3146 | 4.8622 | 70.0000 |
| 19.9957 | 5.0486 | 60.0000 | 52 | 19.0341 | 1.1816 | 60.0000 | | 12.9741 | 9.0616 | 70.0000 | 28 | 12.6081 | 4.7822 | 70.0000 |
| 20.2454 | 4.7843 | 60.0000 | 53 | 19.2778 | 0.9908 | 60.0000 | | 13.3173 | 8.9892 | 70.0000 | 29 | 12.8995 | 4.6957 | 70.0000 |
| 20.4908 | 4.5162 | 60.0000 | 54 | 19.5189 | 0.7968 | 60.0000 | | 13.6578 | 8.9038 | 70.0000 | 30 | 13.1892 | 4.6027 | 70.0000 |
| 20.7314 | 4.2443 | 60.0000 | 55 | 19.7578 | 0.5995 | 60.0000 | | 13.9946 | 8.8059 | 70.0000 | 31 | 13.4768 | 4.5032 | 70.0000 |
| 20.9681 | 3.9681 | 60.0000 | 56 | 19.9941 | 0.3995 | 60.0000 | | 14.3281 | 8.6957 | 70.0000 | 32 | 13.7622 | 4.3978 | 70.0000 |
| 21.2011 | 3.6892 | 60.0000 | 57 | 20.2281 | 0.1968 | 60.0000 | | 14.6568 | 8.5735 | 70.0000 | 33 | 14.0449 | 4.2859 | 70.0000 |
| 21.4297 | 3.4070 | 60.0000 | 58 | 20.4595 | −0.0086 | 60.0000 | | 14.9816 | 8.4395 | 70.0000 | 34 | 14.3254 | 4.1686 | 70.0000 |
| 21.6551 | 3.1216 | 60.0000 | 59 | 20.6886 | −0.2168 | 60.0000 | | 15.3011 | 8.2946 | 70.0000 | 35 | 14.6038 | 4.0454 | 70.0000 |
| 21.8773 | 2.8341 | 60.0000 | 60 | 20.9157 | −0.4276 | 60.0000 | | 15.6157 | 8.1395 | 70.0000 | 36 | 14.8795 | 3.9168 | 70.0000 |
| 22.0957 | 2.5438 | 60.0000 | 61 | 21.1395 | −0.6411 | 60.0000 | | 15.9254 | 7.9735 | 70.0000 | 37 | 15.1524 | 3.7822 | 70.0000 |
| 22.3114 | 2.2514 | 60.0000 | 62 | 21.3616 | −0.8568 | 60.0000 | | 16.2292 | 7.7984 | 70.0000 | 38 | 15.4222 | 3.6422 | 70.0000 |
| 22.5238 | 1.9562 | 60.0000 | 63 | 21.5811 | −1.0751 | 60.0000 | | 16.5281 | 7.6146 | 70.0000 | 39 | 15.6897 | 3.4973 | 70.0000 |
| 22.7330 | 1.6595 | 60.0000 | 64 | 21.7978 | −1.2962 | 60.0000 | | 16.8216 | 7.4216 | 70.0000 | 40 | 15.9541 | 3.3465 | 70.0000 |
| 22.9400 | 1.3605 | 60.0000 | 65 | 22.0130 | −1.5189 | 60.0000 | | 17.1092 | 7.2211 | 70.0000 | 41 | 16.2151 | 3.1908 | 70.0000 |
| 23.1443 | 1.0600 | 60.0000 | 66 | 22.2254 | −1.7443 | 60.0000 | | 17.3919 | 7.0124 | 70.0000 | 42 | 16.4741 | 3.0308 | 70.0000 |
| 23.3459 | 0.7578 | 60.0000 | 67 | 22.4357 | −1.9708 | 60.0000 | | 17.6686 | 6.7973 | 70.0000 | 43 | 16.7292 | 2.8654 | 70.0000 |
| 23.5454 | 0.4541 | 60.0000 | 68 | 22.6443 | −2.2000 | 60.0000 | | 17.9405 | 6.5751 | 70.0000 | 44 | 16.9822 | 2.6962 | 70.0000 |
| 23.7427 | 0.1486 | 60.0000 | 69 | 22.8514 | −2.4303 | 60.0000 | | 18.2070 | 6.3465 | 70.0000 | 45 | 17.2314 | 2.5222 | 70.0000 |
| 23.9373 | −0.1584 | 60.0000 | 70 | 23.0562 | −2.6622 | 60.0000 | | 18.4681 | 6.1119 | 70.0000 | 46 | 17.4784 | 2.3443 | 70.0000 |

TABLE I-continued

| SUCTION-SIDE | | | | PRESSURE-SIDE | | |
|---|---|---|---|---|---|---|
| X (%) | Y (%) | Z (%) | N | X (%) | Y (%) | Z (%) |
| 18.7238 | 5.8714 | 70.0000 | 47 | 17.7222 | 2.1627 | 70.0000 |
| 18.9746 | 5.6259 | 70.0000 | 48 | 17.9638 | 1.9773 | 70.0000 |
| 19.2205 | 5.3757 | 70.0000 | 49 | 18.2022 | 1.7886 | 70.0000 |
| 19.4616 | 5.1205 | 70.0000 | 50 | 18.4378 | 1.5962 | 70.0000 |
| 19.6989 | 4.8616 | 70.0000 | 51 | 18.6708 | 1.4011 | 70.0000 |
| 19.9314 | 4.5989 | 70.0000 | 52 | 18.9016 | 1.2027 | 70.0000 |
| 20.1600 | 4.3330 | 70.0000 | 53 | 19.1297 | 1.0016 | 70.0000 |
| 20.3854 | 4.0632 | 70.0000 | 54 | 19.3557 | 0.7973 | 70.0000 |
| 20.6065 | 3.7914 | 70.0000 | 55 | 19.5789 | 0.5908 | 70.0000 |
| 20.8249 | 3.5162 | 70.0000 | 56 | 19.7995 | 0.3816 | 70.0000 |
| 21.0395 | 3.2384 | 70.0000 | 57 | 20.0178 | 0.1697 | 70.0000 |
| 21.2514 | 2.9584 | 70.0000 | 58 | 20.2341 | -0.0438 | 70.0000 |
| 21.4600 | 2.6762 | 70.0000 | 59 | 20.4481 | -0.2605 | 70.0000 |
| 21.6654 | 2.3919 | 70.0000 | 60 | 20.6595 | -0.4789 | 70.0000 |
| 21.8686 | 2.1054 | 70.0000 | 61 | 20.8692 | -0.6995 | 70.0000 |
| 22.0692 | 1.8173 | 70.0000 | 62 | 21.0762 | -0.9222 | 70.0000 |
| 22.2670 | 1.5276 | 70.0000 | 63 | 21.2816 | -1.1465 | 70.0000 |
| 22.4627 | 1.2362 | 70.0000 | 64 | 21.4849 | -1.3730 | 70.0000 |
| 22.6562 | 0.9432 | 70.0000 | 65 | 21.6865 | -1.6005 | 70.0000 |
| 22.8476 | 0.6492 | 70.0000 | 66 | 21.8865 | -1.8303 | 70.0000 |
| 23.0373 | 0.3541 | 70.0000 | 67 | 22.0843 | -2.0611 | 70.0000 |
| 23.2249 | 0.0573 | 70.0000 | 68 | 22.2805 | -2.2935 | 70.0000 |
| 23.4103 | -0.2405 | 70.0000 | 69 | 22.4757 | -2.5270 | 70.0000 |
| 23.5946 | -0.5395 | 70.0000 | 70 | 22.6692 | -2.7616 | 70.0000 |
| 23.7768 | -0.8395 | 70.0000 | 71 | 22.8611 | -2.9978 | 70.0000 |
| 23.9568 | -1.1405 | 70.0000 | 72 | 23.0514 | -3.2351 | 70.0000 |
| 24.1351 | -1.4427 | 70.0000 | 73 | 23.2405 | -3.4730 | 70.0000 |
| 24.3114 | -1.7465 | 70.0000 | 74 | 23.4286 | -3.7124 | 70.0000 |
| 24.4859 | -2.0508 | 70.0000 | 75 | 23.6151 | -3.9530 | 70.0000 |
| 24.6578 | -2.3568 | 70.0000 | 76 | 23.8000 | -4.1941 | 70.0000 |
| 24.8276 | -2.6638 | 70.0000 | 77 | 23.9832 | -4.4368 | 70.0000 |
| 24.9957 | -2.9719 | 70.0000 | 78 | 24.1654 | -4.6805 | 70.0000 |
| 25.1622 | -3.2811 | 70.0000 | 79 | 24.3454 | -4.9259 | 70.0000 |
| 25.3276 | -3.5908 | 70.0000 | 80 | 24.5243 | -5.1719 | 70.0000 |
| 25.4919 | -3.9011 | 70.0000 | 81 | 24.7011 | -5.4195 | 70.0000 |
| 25.6551 | -4.2114 | 70.0000 | 82 | 24.8762 | -5.6686 | 70.0000 |
| 25.8184 | -4.5222 | 70.0000 | 83 | 25.0492 | -5.9184 | 70.0000 |
| 25.9816 | -4.8330 | 70.0000 | 84 | 25.2200 | -6.1703 | 70.0000 |
| 26.1443 | -5.1438 | 70.0000 | 85 | 25.3892 | -6.4227 | 70.0000 |
| 26.3076 | -5.4546 | 70.0000 | 86 | 25.5568 | -6.6768 | 70.0000 |
| 26.4703 | -5.7659 | 70.0000 | 87 | 25.7222 | -6.9319 | 70.0000 |
| 26.6330 | -6.0768 | 70.0000 | 88 | 25.8865 | -7.1881 | 70.0000 |
| 26.7951 | -6.3881 | 70.0000 | 89 | 26.0486 | -7.4454 | 70.0000 |
| 26.9568 | -6.6995 | 70.0000 | 90 | 26.2103 | -7.7032 | 70.0000 |
| 27.1173 | -7.0119 | 70.0000 | 91 | 26.3703 | -7.9622 | 70.0000 |
| 27.2773 | -7.3243 | 70.0000 | 92 | 26.5297 | -8.2211 | 70.0000 |
| 27.4357 | -7.6373 | 70.0000 | 93 | 26.6886 | -8.4805 | 70.0000 |
| 27.5924 | -7.9514 | 70.0000 | 94 | 26.8470 | -8.7400 | 70.0000 |
| 27.7476 | -8.2665 | 70.0000 | 95 | 27.0054 | -9.0000 | 70.0000 |
| 27.9005 | -8.5822 | 70.0000 | 96 | 27.1638 | -9.2595 | 70.0000 |
| 28.0514 | -8.8989 | 70.0000 | 97 | 27.3222 | -9.5195 | 70.0000 |
| 28.2000 | -9.2168 | 70.0000 | 98 | 27.4897 | -9.7724 | 70.0000 |
| 28.2481 | -9.5573 | 70.0000 | 99 | 27.7562 | -9.9054 | 70.0000 |
| 28.0465 | -9.8341 | 70.0000 | 100 | 28.0465 | -9.8341 | 70.0000 |
| 5.1946 | 6.8195 | 80.0000 | 1 | 5.1946 | 6.8195 | 80.0000 |
| 5.1827 | 7.1551 | 80.0000 | 2 | 5.3562 | 6.5730 | 80.0000 |
| 5.3259 | 7.4627 | 80.0000 | 3 | 5.5930 | 6.3951 | 80.0000 |
| 5.5449 | 7.7238 | 80.0000 | 4 | 5.8611 | 6.2676 | 80.0000 |
| 5.8000 | 7.9497 | 80.0000 | 5 | 6.1427 | 6.1730 | 80.0000 |
| 6.0762 | 8.1497 | 80.0000 | 6 | 6.4319 | 6.1054 | 80.0000 |
| 6.3670 | 8.3281 | 80.0000 | 7 | 6.7259 | 6.0611 | 80.0000 |
| 6.6676 | 8.4886 | 80.0000 | 8 | 7.0216 | 6.0346 | 80.0000 |
| 6.9762 | 8.6341 | 80.0000 | 9 | 7.3184 | 6.0195 | 80.0000 |
| 7.2903 | 8.7665 | 80.0000 | 10 | 7.6151 | 6.0097 | 80.0000 |
| 7.6092 | 8.8865 | 80.0000 | 11 | 7.9124 | 6.0005 | 80.0000 |
| 7.9324 | 8.9957 | 80.0000 | 12 | 8.2092 | 5.9892 | 80.0000 |
| 8.2595 | 9.0935 | 80.0000 | 13 | 8.5059 | 5.9730 | 80.0000 |
| 8.5892 | 9.1800 | 80.0000 | 14 | 8.8022 | 5.9519 | 80.0000 |
| 8.9216 | 9.2551 | 80.0000 | 15 | 9.0984 | 5.9249 | 80.0000 |
| 9.2568 | 9.3184 | 80.0000 | 16 | 9.3935 | 5.8930 | 80.0000 |
| 9.5941 | 9.3692 | 80.0000 | 17 | 9.6886 | 5.8557 | 80.0000 |
| 9.9330 | 9.4070 | 80.0000 | 18 | 9.9827 | 5.8141 | 80.0000 |
| 10.2730 | 9.4319 | 80.0000 | 19 | 10.2762 | 5.7676 | 80.0000 |
| 10.6141 | 9.4438 | 80.0000 | 20 | 10.5686 | 5.7157 | 80.0000 |
| 10.9551 | 9.4422 | 80.0000 | 21 | 10.8605 | 5.6584 | 80.0000 |
| 11.2957 | 9.4270 | 80.0000 | 22 | 11.1508 | 5.5951 | 80.0000 |
| 11.6357 | 9.3989 | 80.0000 | 23 | 11.4395 | 5.5254 | 80.0000 |
| 11.9741 | 9.3573 | 80.0000 | 24 | 11.7270 | 5.4497 | 80.0000 |
| 12.3108 | 9.3027 | 80.0000 | 25 | 12.0124 | 5.3676 | 80.0000 |
| 12.6449 | 9.2351 | 80.0000 | 26 | 12.2962 | 5.2795 | 80.0000 |
| 12.9762 | 9.1551 | 80.0000 | 27 | 12.5778 | 5.1854 | 80.0000 |
| 13.3049 | 9.0622 | 80.0000 | 28 | 12.8578 | 5.0854 | 80.0000 |
| 13.6292 | 8.9578 | 80.0000 | 29 | 13.1351 | 4.9789 | 80.0000 |
| 13.9497 | 8.8416 | 80.0000 | 30 | 13.4108 | 4.8670 | 80.0000 |
| 14.2659 | 8.7141 | 80.0000 | 31 | 13.6832 | 4.7492 | 80.0000 |
| 14.5778 | 8.5757 | 80.0000 | 32 | 13.9530 | 4.6249 | 80.0000 |
| 14.8849 | 8.4276 | 80.0000 | 33 | 14.2205 | 4.4951 | 80.0000 |
| 15.1870 | 8.2692 | 80.0000 | 34 | 14.4849 | 4.3595 | 80.0000 |
| 15.4838 | 8.1016 | 80.0000 | 35 | 14.7465 | 4.2184 | 80.0000 |
| 15.7757 | 7.9249 | 80.0000 | 36 | 15.0049 | 4.0719 | 80.0000 |
| 16.0622 | 7.7400 | 80.0000 | 37 | 15.2605 | 3.9205 | 80.0000 |
| 16.3432 | 7.5470 | 80.0000 | 38 | 15.5135 | 3.7643 | 80.0000 |
| 16.6189 | 7.3459 | 80.0000 | 39 | 15.7632 | 3.6032 | 80.0000 |
| 16.8892 | 7.1378 | 80.0000 | 40 | 16.0097 | 3.4378 | 80.0000 |
| 17.1541 | 6.9232 | 80.0000 | 41 | 16.2535 | 3.2676 | 80.0000 |
| 17.4141 | 6.7027 | 80.0000 | 42 | 16.4946 | 3.0935 | 80.0000 |
| 17.6686 | 6.4757 | 80.0000 | 43 | 16.7324 | 2.9157 | 80.0000 |
| 17.9189 | 6.2438 | 80.0000 | 44 | 16.9670 | 2.7335 | 80.0000 |
| 18.1643 | 6.0070 | 80.0000 | 45 | 17.1989 | 2.5481 | 80.0000 |
| 18.4049 | 5.7654 | 80.0000 | 46 | 17.4286 | 2.3589 | 80.0000 |
| 18.6405 | 5.5189 | 80.0000 | 47 | 17.6551 | 2.1665 | 80.0000 |
| 18.8724 | 5.2686 | 80.0000 | 48 | 17.8789 | 1.9714 | 80.0000 |
| 19.0995 | 5.0141 | 80.0000 | 49 | 18.1000 | 1.7730 | 80.0000 |
| 19.3227 | 4.7568 | 80.0000 | 50 | 18.3189 | 1.5719 | 80.0000 |
| 19.5422 | 4.4957 | 80.0000 | 51 | 18.5351 | 1.3681 | 80.0000 |
| 19.7584 | 4.2319 | 80.0000 | 52 | 18.7492 | 1.1616 | 80.0000 |
| 19.9714 | 3.9654 | 80.0000 | 53 | 18.9605 | 0.9530 | 80.0000 |
| 20.1811 | 3.6962 | 80.0000 | 54 | 19.1697 | 0.7422 | 80.0000 |
| 20.3876 | 3.4249 | 80.0000 | 55 | 19.3768 | 0.5292 | 80.0000 |
| 20.5914 | 3.1514 | 80.0000 | 56 | 19.5816 | 0.3135 | 80.0000 |
| 20.7924 | 2.8762 | 80.0000 | 57 | 19.7843 | 0.0968 | 80.0000 |
| 20.9908 | 2.5984 | 80.0000 | 58 | 19.9854 | -0.1222 | 80.0000 |
| 21.1859 | 2.3189 | 80.0000 | 59 | 20.1843 | -0.3432 | 80.0000 |
| 21.3795 | 2.0378 | 80.0000 | 60 | 20.3816 | -0.5654 | 80.0000 |
| 21.5703 | 1.7551 | 80.0000 | 61 | 20.5768 | -0.7892 | 80.0000 |
| 21.7589 | 1.4714 | 80.0000 | 62 | 20.7708 | -1.0146 | 80.0000 |
| 21.9454 | 1.1859 | 80.0000 | 63 | 20.9627 | -1.2416 | 80.0000 |
| 22.1303 | 0.8989 | 80.0000 | 64 | 21.1530 | -1.4697 | 80.0000 |
| 22.3130 | 0.6114 | 80.0000 | 65 | 21.3416 | -1.6995 | 80.0000 |
| 22.4941 | 0.3222 | 80.0000 | 66 | 21.5286 | -1.9303 | 80.0000 |
| 22.6735 | 0.0324 | 80.0000 | 67 | 21.7141 | -2.1622 | 80.0000 |
| 22.8514 | -0.2584 | 80.0000 | 68 | 21.8984 | -2.3951 | 80.0000 |
| 23.0281 | -0.5508 | 80.0000 | 69 | 22.0811 | -2.6297 | 80.0000 |
| 23.2027 | -0.8432 | 80.0000 | 70 | 22.2627 | -2.8649 | 80.0000 |
| 23.3751 | -1.1373 | 80.0000 | 71 | 22.4427 | -3.1011 | 80.0000 |
| 23.5465 | -1.4324 | 80.0000 | 72 | 22.6222 | -3.3384 | 80.0000 |
| 23.7157 | -1.7286 | 80.0000 | 73 | 22.8000 | -3.5762 | 80.0000 |
| 23.8827 | -2.0259 | 80.0000 | 74 | 22.9773 | -3.8146 | 80.0000 |
| 24.0481 | -2.3243 | 80.0000 | 75 | 23.1535 | -4.0541 | 80.0000 |
| 24.2119 | -2.6232 | 80.0000 | 76 | 23.3286 | -4.2941 | 80.0000 |
| 24.3741 | -2.9232 | 80.0000 | 77 | 23.5032 | -4.5346 | 80.0000 |
| 24.5346 | -3.2243 | 80.0000 | 78 | 23.6762 | -4.7762 | 80.0000 |
| 24.6941 | -3.5259 | 80.0000 | 79 | 23.8481 | -5.0184 | 80.0000 |
| 24.8519 | -3.8281 | 80.0000 | 80 | 24.0189 | -5.2616 | 80.0000 |
| 25.0092 | -4.1308 | 80.0000 | 81 | 24.1881 | -5.5059 | 80.0000 |
| 25.1659 | -4.4335 | 80.0000 | 82 | 24.3551 | -5.7514 | 80.0000 |
| 25.3227 | -4.7362 | 80.0000 | 83 | 24.5205 | -5.9984 | 80.0000 |
| 25.4789 | -5.0395 | 80.0000 | 84 | 24.6838 | -6.2470 | 80.0000 |
| 25.6351 | -5.3427 | 80.0000 | 85 | 24.8449 | -6.4962 | 80.0000 |
| 25.7914 | -5.6459 | 80.0000 | 86 | 25.0043 | -6.7470 | 80.0000 |
| 25.9476 | -5.9492 | 80.0000 | 87 | 25.1616 | -6.9989 | 80.0000 |
| 26.1038 | -6.2524 | 80.0000 | 88 | 25.3184 | -7.2514 | 80.0000 |
| 26.2600 | -6.5551 | 80.0000 | 89 | 25.4741 | -7.5049 | 80.0000 |
| 26.4157 | -6.8589 | 80.0000 | 90 | 25.6292 | -7.7584 | 80.0000 |
| 26.5708 | -7.1627 | 80.0000 | 91 | 25.7832 | -8.0119 | 80.0000 |
| 26.7254 | -7.4665 | 80.0000 | 92 | 25.9378 | -8.2659 | 80.0000 |
| 26.8784 | -7.7714 | 80.0000 | 93 | 26.0914 | -8.5205 | 80.0000 |
| 27.0297 | -8.0768 | 80.0000 | 94 | 26.2454 | -8.7746 | 80.0000 |
| 27.1795 | -8.3832 | 80.0000 | 95 | 26.3989 | -9.0286 | 80.0000 |
| 27.3276 | -8.6908 | 80.0000 | 96 | 26.5530 | -9.2832 | 80.0000 |
| 27.4735 | -8.9989 | 80.0000 | 97 | 26.7065 | -9.5373 | 80.0000 |
| 27.6162 | -9.3086 | 80.0000 | 98 | 26.8649 | -9.7886 | 80.0000 |

TABLE I-continued

| SUCTION-SIDE | | | | PRESSURE-SIDE | | |
|---|---|---|---|---|---|---|
| X (%) | Y (%) | Z (%) | N | X (%) | Y (%) | Z (%) |
| 27.6259 | −9.6416 | 80.0000 | 99 | 27.1162 | −9.9368 | 80.0000 |
| 27.4043 | −9.8908 | 80.0000 | 100 | 27.4043 | −9.8908 | 80.0000 |
| 5.6151 | 7.7384 | 90.0000 | 1 | 5.6151 | 7.7384 | 90.0000 |
| 5.6362 | 8.0627 | 90.0000 | 2 | 5.7476 | 7.4811 | 90.0000 |
| 5.8022 | 8.3459 | 90.0000 | 3 | 5.9616 | 7.2838 | 90.0000 |
| 6.0357 | 8.5773 | 90.0000 | 4 | 6.2124 | 7.1346 | 90.0000 |
| 6.3022 | 8.7714 | 90.0000 | 5 | 6.4795 | 7.0178 | 90.0000 |
| 6.5865 | 8.9378 | 90.0000 | 6 | 6.7568 | 6.9270 | 90.0000 |
| 6.8832 | 9.0816 | 90.0000 | 7 | 7.0411 | 6.8595 | 90.0000 |
| 7.1881 | 9.2070 | 90.0000 | 8 | 7.3286 | 6.8103 | 90.0000 |
| 7.4995 | 9.3157 | 90.0000 | 9 | 7.6178 | 6.7703 | 90.0000 |
| 7.8151 | 9.4114 | 90.0000 | 10 | 7.9076 | 6.7346 | 90.0000 |
| 8.1341 | 9.4935 | 90.0000 | 11 | 8.1968 | 6.6984 | 90.0000 |
| 8.4562 | 9.5638 | 90.0000 | 12 | 8.4859 | 6.6584 | 90.0000 |
| 8.7811 | 9.6216 | 90.0000 | 13 | 8.7746 | 6.6146 | 90.0000 |
| 9.1076 | 9.6676 | 90.0000 | 14 | 9.0627 | 6.5659 | 90.0000 |
| 9.4351 | 9.7011 | 90.0000 | 15 | 9.3497 | 6.5119 | 90.0000 |
| 9.7643 | 9.7216 | 90.0000 | 16 | 9.6357 | 6.4535 | 90.0000 |
| 10.0941 | 9.7292 | 90.0000 | 17 | 9.9205 | 6.3908 | 90.0000 |
| 10.4238 | 9.7232 | 90.0000 | 18 | 10.2049 | 6.3238 | 90.0000 |
| 10.7530 | 9.7049 | 90.0000 | 19 | 10.4876 | 6.2524 | 90.0000 |
| 11.0811 | 9.6730 | 90.0000 | 20 | 10.7692 | 6.1757 | 90.0000 |
| 11.4076 | 9.6281 | 90.0000 | 21 | 11.0497 | 6.0941 | 90.0000 |
| 11.7324 | 9.5714 | 90.0000 | 22 | 11.3281 | 6.0070 | 90.0000 |
| 12.0546 | 9.5016 | 90.0000 | 23 | 11.6049 | 5.9141 | 90.0000 |
| 12.3741 | 9.4200 | 90.0000 | 24 | 11.8795 | 5.8157 | 90.0000 |
| 12.6903 | 9.3265 | 90.0000 | 25 | 12.1524 | 5.7114 | 90.0000 |
| 13.0027 | 9.2222 | 90.0000 | 26 | 12.4232 | 5.6022 | 90.0000 |
| 13.3114 | 9.1065 | 90.0000 | 27 | 12.6914 | 5.4870 | 90.0000 |
| 13.6162 | 8.9805 | 90.0000 | 28 | 12.9573 | 5.3659 | 90.0000 |
| 13.9162 | 8.8443 | 90.0000 | 29 | 13.2205 | 5.2400 | 90.0000 |
| 14.2119 | 8.6984 | 90.0000 | 30 | 13.4811 | 5.1086 | 90.0000 |
| 14.5032 | 8.5438 | 90.0000 | 31 | 13.7389 | 4.9719 | 90.0000 |
| 14.7892 | 8.3800 | 90.0000 | 32 | 13.9935 | 4.8297 | 90.0000 |
| 15.0708 | 8.2081 | 90.0000 | 33 | 14.2454 | 4.6822 | 90.0000 |
| 15.3470 | 8.0286 | 90.0000 | 34 | 14.4946 | 4.5297 | 90.0000 |
| 15.6184 | 7.8416 | 90.0000 | 35 | 14.7405 | 4.3724 | 90.0000 |
| 15.8854 | 7.6476 | 90.0000 | 36 | 14.9832 | 4.2103 | 90.0000 |
| 16.1465 | 7.4470 | 90.0000 | 37 | 15.2232 | 4.0438 | 90.0000 |
| 16.4032 | 7.2400 | 90.0000 | 38 | 15.4595 | 3.8730 | 90.0000 |
| 16.6551 | 7.0270 | 90.0000 | 39 | 15.6935 | 3.6984 | 90.0000 |
| 16.9022 | 6.8086 | 90.0000 | 40 | 15.9243 | 3.5195 | 90.0000 |
| 17.1443 | 6.5849 | 90.0000 | 41 | 16.1524 | 3.3373 | 90.0000 |
| 17.3816 | 6.3562 | 90.0000 | 42 | 16.3773 | 3.1514 | 90.0000 |
| 17.6151 | 6.1232 | 90.0000 | 43 | 16.5995 | 2.9622 | 90.0000 |
| 17.8438 | 5.8859 | 90.0000 | 44 | 16.8189 | 2.7697 | 90.0000 |
| 18.0686 | 5.6443 | 90.0000 | 45 | 17.0357 | 2.5741 | 90.0000 |
| 18.2892 | 5.3995 | 90.0000 | 46 | 17.2497 | 2.3757 | 90.0000 |
| 18.5065 | 5.1514 | 90.0000 | 47 | 17.4611 | 2.1746 | 90.0000 |
| 18.7200 | 4.9005 | 90.0000 | 48 | 17.6703 | 1.9708 | 90.0000 |
| 18.9303 | 4.6465 | 90.0000 | 49 | 17.8768 | 1.7643 | 90.0000 |
| 19.1373 | 4.3903 | 90.0000 | 50 | 18.0811 | 1.5557 | 90.0000 |
| 19.3416 | 4.1314 | 90.0000 | 51 | 18.2832 | 1.3454 | 90.0000 |
| 19.5427 | 3.8697 | 90.0000 | 52 | 18.4832 | 1.1330 | 90.0000 |
| 19.7411 | 3.6065 | 90.0000 | 53 | 18.6816 | 0.9184 | 90.0000 |
| 19.9368 | 3.3411 | 90.0000 | 54 | 18.8778 | 0.7027 | 90.0000 |
| 20.1297 | 3.0735 | 90.0000 | 55 | 19.0724 | 0.4849 | 90.0000 |
| 20.3200 | 2.8049 | 90.0000 | 56 | 19.2649 | 0.2654 | 90.0000 |
| 20.5081 | 2.5341 | 90.0000 | 57 | 19.4557 | 0.0443 | 90.0000 |
| 20.6941 | 2.2616 | 90.0000 | 58 | 19.6449 | −0.1778 | 90.0000 |
| 20.8778 | 1.9876 | 90.0000 | 59 | 19.8324 | −0.4016 | 90.0000 |
| 21.0595 | 1.7124 | 90.0000 | 60 | 20.0178 | −0.6270 | 90.0000 |
| 21.2389 | 1.4362 | 90.0000 | 61 | 20.2016 | −0.8535 | 90.0000 |
| 21.4168 | 1.1584 | 90.0000 | 62 | 20.3843 | −1.0816 | 90.0000 |
| 21.5924 | 0.8795 | 90.0000 | 63 | 20.5649 | −1.3108 | 90.0000 |
| 21.7665 | 0.5995 | 90.0000 | 64 | 20.7449 | −1.5411 | 90.0000 |
| 21.9384 | 0.3184 | 90.0000 | 65 | 20.9227 | −1.7719 | 90.0000 |
| 22.1092 | 0.0362 | 90.0000 | 66 | 21.1000 | −2.0038 | 90.0000 |
| 22.2778 | −0.2470 | 90.0000 | 67 | 21.2762 | −2.2368 | 90.0000 |
| 22.4454 | −0.5308 | 90.0000 | 68 | 21.4514 | −2.4703 | 90.0000 |
| 22.6114 | −0.8162 | 90.0000 | 69 | 21.6254 | −2.7049 | 90.0000 |
| 22.7757 | −1.1016 | 90.0000 | 70 | 21.7984 | −2.9400 | 90.0000 |
| 22.9384 | −1.3886 | 90.0000 | 71 | 21.9708 | −3.1751 | 90.0000 |
| 23.1000 | −1.6757 | 90.0000 | 72 | 22.1422 | −3.4114 | 90.0000 |
| 23.2600 | −1.9643 | 90.0000 | 73 | 22.3130 | −3.6481 | 90.0000 |
| 23.4184 | −2.2535 | 90.0000 | 74 | 22.4827 | −3.8859 | 90.0000 |
| 23.5757 | −2.5432 | 90.0000 | 75 | 22.6519 | −4.1238 | 90.0000 |
| 23.7314 | −2.8335 | 90.0000 | 76 | 22.8195 | −4.3627 | 90.0000 |
| 23.8859 | −3.1249 | 90.0000 | 77 | 22.9865 | −4.6022 | 90.0000 |
| 24.0389 | −3.4168 | 90.0000 | 78 | 23.1519 | −4.8427 | 90.0000 |
| 24.1908 | −3.7097 | 90.0000 | 79 | 23.3168 | −5.0838 | 90.0000 |
| 24.3411 | −4.0027 | 90.0000 | 80 | 23.4800 | −5.3254 | 90.0000 |
| 24.4908 | −4.2968 | 90.0000 | 81 | 23.6422 | −5.5686 | 90.0000 |
| 24.6400 | −4.5908 | 90.0000 | 82 | 23.8027 | −5.8119 | 90.0000 |
| 24.7881 | −4.8854 | 90.0000 | 83 | 23.9616 | −6.0568 | 90.0000 |
| 24.9368 | −5.1800 | 90.0000 | 84 | 24.1195 | −6.3022 | 90.0000 |
| 25.0849 | −5.4741 | 90.0000 | 85 | 24.2762 | −6.5486 | 90.0000 |
| 25.2335 | −5.7686 | 90.0000 | 86 | 24.4314 | −6.7962 | 90.0000 |
| 25.3827 | −6.0627 | 90.0000 | 87 | 24.5849 | −7.0443 | 90.0000 |
| 25.5319 | −6.3562 | 90.0000 | 88 | 24.7373 | −7.2930 | 90.0000 |
| 25.6816 | −6.6503 | 90.0000 | 89 | 24.8892 | −7.5427 | 90.0000 |
| 25.8314 | −6.9438 | 90.0000 | 90 | 25.0395 | −7.7924 | 90.0000 |
| 25.9805 | −7.2378 | 90.0000 | 91 | 25.1897 | −8.0432 | 90.0000 |
| 26.1297 | −7.5319 | 90.0000 | 92 | 25.3389 | −8.2941 | 90.0000 |
| 26.2773 | −7.8270 | 90.0000 | 93 | 25.4881 | −8.5449 | 90.0000 |
| 26.4238 | −8.1222 | 90.0000 | 94 | 25.6378 | −8.7957 | 90.0000 |
| 26.5681 | −8.4184 | 90.0000 | 95 | 25.7870 | −9.0465 | 90.0000 |
| 26.7108 | −8.7157 | 90.0000 | 96 | 25.9368 | −9.2968 | 90.0000 |
| 26.8514 | −9.0141 | 90.0000 | 97 | 26.0876 | −9.5470 | 90.0000 |
| 26.9881 | −9.3141 | 90.0000 | 98 | 26.2459 | −9.7914 | 90.0000 |
| 26.9914 | −9.6368 | 90.0000 | 99 | 26.4962 | −9.9303 | 90.0000 |
| 26.7784 | −9.8795 | 90.0000 | 100 | 26.7784 | −9.8795 | 90.0000 |
| 6.0595 | 8.6341 | ####### | 1 | 6.0595 | 8.6341 | 100.0000 |
| 6.0427 | 8.9486 | ####### | 2 | 6.2108 | 8.3924 | 100.0000 |
| 6.1946 | 9.2276 | ####### | 3 | 6.4259 | 8.2038 | 100.0000 |
| 6.4286 | 9.4454 | ####### | 4 | 6.6697 | 8.0541 | 100.0000 |
| 6.6989 | 9.6168 | ####### | 5 | 6.9303 | 7.9341 | 100.0000 |
| 6.9870 | 9.7557 | ####### | 6 | 7.2005 | 7.8384 | 100.0000 |
| 7.2865 | 9.8692 | ####### | 7 | 7.4768 | 7.7611 | 100.0000 |
| 7.5935 | 9.9616 | ####### | 8 | 7.7557 | 7.6968 | 100.0000 |
| 7.9049 | 10.0357 | ####### | 9 | 8.0368 | 7.6378 | 100.0000 |
| 8.2200 | 10.0935 | ####### | 10 | 8.3173 | 7.5789 | 100.0000 |
| 8.5373 | 10.1368 | ####### | 11 | 8.5968 | 7.5157 | 100.0000 |
| 8.8562 | 10.1659 | ####### | 12 | 8.8751 | 7.4476 | 100.0000 |
| 9.1757 | 10.1822 | ####### | 13 | 9.1524 | 7.3735 | 100.0000 |
| 9.4962 | 10.1849 | ####### | 14 | 9.4281 | 7.2951 | 100.0000 |
| 9.8162 | 10.1746 | ####### | 15 | 9.7027 | 7.2130 | 100.0000 |
| 10.1357 | 10.1508 | ####### | 16 | 9.9762 | 7.1259 | 100.0000 |
| 10.4541 | 10.1146 | ####### | 17 | 10.2481 | 7.0346 | 100.0000 |
| 10.7703 | 10.0659 | ####### | 18 | 10.5178 | 6.9384 | 100.0000 |
| 11.0849 | 10.0049 | ####### | 19 | 10.7859 | 6.8373 | 100.0000 |
| 11.3968 | 9.9324 | ####### | 20 | 11.0519 | 6.7303 | 100.0000 |
| 11.7059 | 9.8492 | ####### | 21 | 11.3162 | 6.6184 | 100.0000 |
| 12.0119 | 9.7541 | ####### | 22 | 11.5778 | 6.5011 | 100.0000 |
| 12.3141 | 9.6481 | ####### | 23 | 11.8373 | 6.3795 | 100.0000 |
| 12.6119 | 9.5308 | ####### | 24 | 12.0946 | 6.2530 | 100.0000 |
| 12.9059 | 9.4032 | ####### | 25 | 12.3492 | 6.1211 | 100.0000 |
| 13.1957 | 9.2670 | ####### | 26 | 12.6016 | 5.9843 | 100.0000 |
| 13.4816 | 9.1222 | ####### | 27 | 12.8508 | 5.8427 | 100.0000 |
| 13.7622 | 8.9686 | ####### | 28 | 13.0973 | 5.6962 | 100.0000 |
| 14.0389 | 8.8070 | ####### | 29 | 13.3411 | 5.5454 | 100.0000 |
| 14.3108 | 8.6373 | ####### | 30 | 13.5816 | 5.3897 | 100.0000 |
| 14.5778 | 8.4605 | ####### | 31 | 13.8195 | 5.2297 | 100.0000 |
| 14.8405 | 8.2773 | ####### | 32 | 14.0546 | 5.0654 | 100.0000 |
| 15.0984 | 8.0870 | ####### | 33 | 14.2865 | 4.8968 | 100.0000 |
| 15.3514 | 7.8908 | ####### | 34 | 14.5157 | 4.7243 | 100.0000 |
| 15.5995 | 7.6886 | ####### | 35 | 14.7416 | 4.5481 | 100.0000 |
| 15.8438 | 7.4811 | ####### | 36 | 14.9649 | 4.3681 | 100.0000 |
| 16.0832 | 7.2686 | ####### | 37 | 15.1854 | 4.1849 | 100.0000 |
| 16.3184 | 7.0508 | ####### | 38 | 15.4027 | 3.9978 | 100.0000 |
| 16.5492 | 6.8292 | ####### | 39 | 15.6178 | 3.8081 | 100.0000 |
| 16.7757 | 6.6027 | ####### | 40 | 15.8303 | 3.6157 | 100.0000 |
| 16.9984 | 6.3724 | ####### | 41 | 16.0400 | 3.4200 | 100.0000 |
| 17.2173 | 6.1389 | ####### | 42 | 16.2470 | 3.2216 | 100.0000 |
| 17.4324 | 5.9011 | ####### | 43 | 16.4519 | 3.0211 | 100.0000 |
| 17.6438 | 5.6611 | ####### | 44 | 16.6541 | 2.8184 | 100.0000 |
| 17.8519 | 5.4173 | ####### | 45 | 16.8546 | 2.6130 | 100.0000 |
| 18.0568 | 5.1714 | ####### | 46 | 17.0524 | 2.4059 | 100.0000 |
| 18.2584 | 4.9222 | ####### | 47 | 17.2486 | 2.1962 | 100.0000 |
| 18.4573 | 4.6714 | ####### | 48 | 17.4427 | 1.9854 | 100.0000 |
| 18.6530 | 4.4178 | ####### | 49 | 17.6346 | 1.7724 | 100.0000 |
| 18.8465 | 4.1622 | ####### | 50 | 17.8249 | 1.5578 | 100.0000 |

TABLE I-continued

| SUCTION-SIDE | | | N | PRESSURE-SIDE | | |
|---|---|---|---|---|---|---|
| X (%) | Y (%) | Z (%) | | X (%) | Y (%) | Z (%) |
| 19.0368 | 3.9049 | ###### | 51 | 18.0130 | 1.3416 | 100.0000 |
| 19.2249 | 3.6454 | ###### | 52 | 18.1995 | 1.1238 | 100.0000 |
| 19.4108 | 3.3843 | ###### | 53 | 18.3843 | 0.9043 | 100.0000 |
| 19.5941 | 3.1222 | ###### | 54 | 18.5670 | 0.6838 | 100.0000 |
| 19.7757 | 2.8578 | ###### | 55 | 18.7486 | 0.4616 | 100.0000 |
| 19.9546 | 2.5924 | ###### | 56 | 18.9286 | 0.2384 | 100.0000 |
| 20.1324 | 2.3259 | ###### | 57 | 19.1070 | 0.0141 | 100.0000 |
| 20.3076 | 2.0578 | ###### | 58 | 19.2843 | −0.2114 | 100.0000 |
| 20.4816 | 1.7892 | ###### | 59 | 19.4605 | −0.4378 | 100.0000 |
| 20.6535 | 1.5189 | ###### | 60 | 19.6351 | −0.6649 | 100.0000 |
| 20.8238 | 1.2476 | ###### | 61 | 19.8086 | −0.8930 | 100.0000 |
| 20.9924 | 0.9751 | ###### | 62 | 19.9811 | −1.1222 | 100.0000 |
| 21.1595 | 0.7016 | ###### | 63 | 20.1524 | −1.3519 | 100.0000 |
| 21.3249 | 0.4276 | ###### | 64 | 20.3232 | −1.5827 | 100.0000 |
| 21.4886 | 0.1524 | ###### | 65 | 20.4924 | −1.8141 | 100.0000 |
| 21.6514 | −0.1232 | ###### | 66 | 20.6611 | −2.0459 | 100.0000 |
| 21.8124 | −0.4000 | ###### | 67 | 20.8286 | −2.2784 | 100.0000 |
| 21.9724 | −0.6778 | ###### | 68 | 20.9957 | −2.5119 | 100.0000 |
| 22.1303 | −0.9562 | ###### | 69 | 21.1616 | −2.7454 | 100.0000 |
| 22.2870 | −1.2357 | ###### | 70 | 21.3265 | −2.9800 | 100.0000 |
| 22.4427 | −1.5157 | ###### | 71 | 21.4908 | −3.2146 | 100.0000 |
| 22.5968 | −1.7968 | ###### | 72 | 21.6546 | −3.4503 | 100.0000 |
| 22.7492 | −2.0784 | ###### | 73 | 21.8173 | −3.6859 | 100.0000 |
| 22.9005 | −2.3605 | ###### | 74 | 21.9795 | −3.9227 | 100.0000 |
| 23.0503 | −2.6438 | ###### | 75 | 22.1411 | −4.1595 | 100.0000 |
| 23.1984 | −2.9276 | ###### | 76 | 22.3016 | −4.3973 | 100.0000 |
| 23.3454 | −3.2119 | ###### | 77 | 22.4616 | −4.6351 | 100.0000 |
| 23.4914 | −3.4973 | ###### | 78 | 22.6205 | −4.8735 | 100.0000 |
| 23.6362 | −3.7827 | ###### | 79 | 22.7789 | −5.1130 | 100.0000 |
| 23.7805 | −4.0686 | ###### | 80 | 22.9362 | −5.3524 | 100.0000 |
| 23.9243 | −4.3551 | ###### | 81 | 23.0924 | −5.5930 | 100.0000 |
| 24.0676 | −4.6416 | ###### | 82 | 23.2476 | −5.8341 | 100.0000 |
| 24.2108 | −4.9281 | ###### | 83 | 23.4022 | −6.0757 | 100.0000 |
| 24.3541 | −5.2146 | ###### | 84 | 23.5551 | −6.3178 | 100.0000 |
| 24.4978 | −5.5005 | ###### | 85 | 23.7070 | −6.5611 | 100.0000 |
| 24.6422 | −5.7865 | ###### | 86 | 23.8578 | −6.8049 | 100.0000 |
| 24.7865 | −6.0724 | ###### | 87 | 24.0076 | −7.0497 | 100.0000 |
| 24.9314 | −6.3584 | ###### | 88 | 24.1557 | −7.2951 | 100.0000 |
| 25.0762 | −6.6438 | ###### | 89 | 24.3027 | −7.5411 | 100.0000 |
| 25.2205 | −6.9297 | ###### | 90 | 24.4486 | −7.7881 | 100.0000 |
| 25.3649 | −7.2157 | ###### | 91 | 24.5946 | −8.0351 | 100.0000 |
| 25.5086 | −7.5022 | ###### | 92 | 24.7395 | −8.2822 | 100.0000 |
| 25.6514 | −7.7886 | ###### | 93 | 24.8849 | −8.5297 | 100.0000 |
| 25.7924 | −8.0762 | ###### | 94 | 25.0297 | −8.7768 | 100.0000 |
| 25.9319 | −8.3643 | ###### | 95 | 25.1757 | −9.0238 | 100.0000 |
| 26.0697 | −8.6535 | ###### | 96 | 25.3222 | −9.2703 | 100.0000 |
| 26.2059 | −8.9438 | ###### | 97 | 25.4697 | −9.5162 | 100.0000 |
| 26.3395 | −9.2346 | ###### | 98 | 25.6324 | −9.7508 | 100.0000 |
| 26.3551 | −9.5486 | ###### | 99 | 25.8886 | −9.8659 | 100.0000 |
| 26.1622 | −9.7957 | ###### | 100 | 26.1622 | −9.7957 | 100.0000 |

It will also be appreciated that the airfoil 52 disclosed in the above Table I may be scaled up or down geometrically for use in other similar turbine designs. Consequently, the coordinate values set forth in Table I may be scaled upwardly or downwardly such that the airfoil profile shape remains unchanged. A scaled version of the coordinates in Table I would be represented by X, Y and Z coordinate values of Table I, with the X, Y and Z non-dimensional coordinate values converted to inches, multiplied or divided by a constant number.

An important term in this disclosure is "profile". The profile is the range of the variation between measured points on an airfoil surface and the ideal position listed in Table I. The actual profile on a manufactured turbine rotor blade will be different than those in Table I and the design is robust to this variation meaning that mechanical and aerodynamic function are not impaired. As noted above, a + or −5% profile tolerance is used herein. The X, Y and Z values are all non-dimensionalized relative to the airfoil height.

The disclosed airfoil shape optimizes and is specific to the machine conditions and specifications. It provides a unique profile to achieve 1) interaction between other stages in the turbine 10; 2) aerodynamic efficiency; and 3) normalized aerodynamic and mechanical blade loadings. The disclosed loci of points defined in Table I allow the gas turbine 12 or any other suitable turbine to run in an efficient, safe and smooth manner. As also noted, any scale of the disclosed airfoil 52 may be adopted as long as 1) interaction between other stages in the pressure turbine 10; 2) aerodynamic efficiency; and 3) normalized aerodynamic and mechanical blade loadings are maintained in the scaled turbine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine rotor blade including an airfoil having an airfoil shape, the airfoil having a nominal profile substantially in accordance with Cartesian coordinate values of X, Y and Z set forth in Table I, wherein the Cartesian coordinate values of X, Y and Z are non-dimensional values from 0% to 100% convertible to dimensional distances in inches by multiplying the Cartesian coordinate values of X, Y and Z by a height of the airfoil in inches, and wherein X and Y are distances in inches which, when connected by smooth continuing arcs, define airfoil profile sections at each distance Z, the airfoil profile sections at Z distances being joined smoothly with one another to form a complete airfoil shape.

2. The turbine rotor blade as in claim 1, forming part of a stage of a turbine.

3. The turbine rotor blade as in claim 1, wherein the turbine rotor blade forms a part of a third stage of turbine rotor blades of a turbine of a gas turbine.

4. The turbine rotor blade as in claim 1, wherein the airfoil shape lies in an envelope within +/−5% in a direction normal to any airfoil surface location.

5. The turbine rotor blade as in claim 1, wherein a height of the turbine rotor blade is 10 inches to 40 inches.

6. A turbine rotor blade including an airfoil having a suction-side uncoated nominal airfoil profile substantially in accordance with suction-side Cartesian coordinate values of X, Y and Z set forth in Table I, wherein the Cartesian coordinate values of X, Y and Z are non-dimensional values from 0% to 100% convertible to dimensional distances in inches by multiplying the Cartesian coordinate values of X, Y and Z by a height of the airfoil in inches, and wherein X and Y are distances in inches which, when connected by smooth continuing arcs, define airfoil profile sections at each Z distance, the airfoil profile sections at the Z distances being joined smoothly with one another to form a complete suction-side airfoil shape, the X, Y and Z distances being scalable as a function of the same constant or number to provide a scaled-up or scaled-down airfoil.

7. The turbine rotor blade as in claim 6, forming part of a stage of a turbine.

8. The turbine rotor blade as in claim 6, wherein the turbine rotor blade forms a part of a third stage of turbine rotor blades of a turbine of a gas turbine.

9. The turbine rotor blade as in claim 6, wherein the suction-side airfoil shape lies in an envelope within +/−5% in a direction normal to any suction-side airfoil surface location.

10. The turbine rotor blade as in claim 6, wherein a height of the turbine rotor blade is about 10 inches to about 40 inches.

11. A turbine comprising a turbine wheel having a plurality of turbine rotor blades, each of the turbine rotor blades including an airfoil having a suction-side airfoil shape, the airfoil having a nominal profile substantially in accordance with suction-side Cartesian coordinate values of X, Y and Z set forth in Table I wherein the Cartesian coordinate values of X, Y and Z are non-dimensional values from 0% to 100% convertible to dimensional distances by multiplying the Cartesian coordinate values of X, Y and Z by a height of the airfoil, and wherein X and Y are distances which, when connected by smooth continuing arcs, define airfoil profile sections at each Z distance, the airfoil profile sections at the Z distances being joined smoothly with one another to form a complete suction-side airfoil shape.

12. The turbine as in claim 11, wherein the turbine wheel comprises a stage of the turbine.

13. The turbine as in claim 11, wherein X represents a distance parallel to the turbine axis of rotation.

14. The turbine as in claim 11, wherein the suction-side airfoil shape lies in an envelope within +/−5% in a direction normal to any suction-side airfoil surface location.

15. The turbine as in claim 11, wherein a height of the turbine rotor blade is about 10 inches to about 40 inches.

16. The turbine as in claim 11, wherein each of the turbine rotor blades includes an airfoil having a pressure-side airfoil shape, the airfoil having a nominal profile substantially in accordance with pressure-side Cartesian coordinate values of X, Y and Z set forth in Table I wherein the pressure-side Cartesian coordinate values of X, Y and Z are non-dimensional values from 0% to 100% convertible to dimensional distances by multiplying the pressure-side Cartesian coordinate values of X, Y and Z by a height of the airfoil, and wherein X and Y are distances which, when connected by smooth continuing arcs, define airfoil profile sections at each Z distance, the airfoil profile sections at Z distances being joined smoothly with one another to form a complete airfoil shape.

17. The turbine as in claim 16, wherein the turbine rotor blade is a third stage turbine rotor blade.

18. The turbine as in claim 14, wherein X represents a distance parallel to the turbine axis of rotation.

19. The turbine as in claim 16, wherein the airfoil shape lies in an envelope within +/−5% in a direction normal to any airfoil surface location.

20. The turbine as in claim 16, wherein a height of the turbine rotor blade is about 10 inches to about 40 inches.

* * * * *